United States Patent
Masood et al.

(10) Patent No.: US 12,047,100 B2
(45) Date of Patent: Jul. 23, 2024

(54) SYSTEM AND METHOD FOR DIGITAL PREDISTORTION

(71) Applicant: NXP USA, Inc., Austin, TX (US)

(72) Inventors: Mir Adeel Masood, Mesa, AZ (US); Peter Zahariev Rashev, Alberta (CA)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 18/085,303

(22) Filed: Dec. 20, 2022

(65) Prior Publication Data

US 2024/0204809 A1    Jun. 20, 2024

(51) Int. Cl.
*H04B 1/04* (2006.01)
(52) U.S. Cl.
CPC ... *H04B 1/0475* (2013.01); *H04B 2001/0425* (2013.01)
(58) Field of Classification Search
CPC .................. H04B 1/0475; H04B 2001/0425
USPC ........................................................ 375/297
See application file for complete search history.

(56) References Cited

U.S. PATENT DOCUMENTS

| | | | |
|---|---|---|---|
| 9,843,346 B1* | 12/2017 | Mundarath | ............. H03F 3/195 |
| 9,866,269 B1* | 1/2018 | Zhao | ..................... H03F 1/3247 |
| 10,224,970 B2 | 3/2019 | Pratt | |

FOREIGN PATENT DOCUMENTS

EP         3334040 B1    12/2019

OTHER PUBLICATIONS

Ren, Jijun; "A New Digital Predistortion Algorithms Scheme of Feedback FIR Cross-Term Memory Polynomial Model for Short-Wave Power Amplifier;" IEEE Access; 6 pages (Mar. 3, 2020).
Sun, Gang et al; "An Accurate Complexity-Reduced Simplified Volterra Series for RF Power Amplifiers"; Progress in Electromagnetics Research C, vol. 47; 10 pages; (2014).
Liu, You-Jiang et al; "A Robust Augmented Complexity-Reduced Generalized Memory Polynomial for Wideband RF Power Amplifiers"; IEEE Transactions on Industrial Electronics, vol. 61, No. 5; 13 pages (May 2014).
Du, T. et al; "A New Accurate Volterra-Based Model for Behavioral Modeling and Digital Predistortion of RF Power Amplifiers"; Progress in Electromagnetics Research C, vol. 29; pp. 205-218; (2012).

* cited by examiner

*Primary Examiner* — Kevin M Burd

(57) ABSTRACT

Systems and methods for digital predistortion (DPD) are disclosed herein. In an example embodiment, a digital front-end circuit includes a DPD block, power amplifier, and transmitter. The DPD block is configured to receive an input signal and to provide a first output signal, and includes a nonlinear model that is configured to generate a nonlinear model output signal based upon the input signal. The DPD block additionally includes a first mixing module that is configured to generate a mixing module output signal based upon the input signal and the nonlinear model output signal. The DPD block further includes a summation block that is configured to generate the first output signal at least in part as a first sum of the nonlinear model output signal and the mixing module output signal, and the first mixing module includes a plurality of first finite impulse response (FIR) filters.

20 Claims, 7 Drawing Sheets

SYSTEM AND METHOD FOR DIGITAL PREDISTORTION

FIELD OF THE DISCLOSURE

This disclosure relates generally to communications circuits and, more particularly, to systems for digital predistortion (DPD) for a power amplifier (PA), such as digital front-end circuits for transmitters, as well as methods for DPD.

BACKGROUND OF THE DISCLOSURE

Growing demand of high data rates and exponential growth of wireless subscribers has led to the widespread use of spectrum efficient complex modulation schemes with high peak to average ratio (PAPR) and wideband signal bandwidth. These complex modulation schemes pose significant challenges for the linearization techniques for radio frequency (RF) power amplifiers.

Digital predistortion (DPD) is a widely used PA linearization technique that allows for improving the efficiency of the PA by reducing the backoff while meeting the required linearity conditions such as spectrum emission mask (SEM) and adjacent channel power (ACP) specifications. Yet modern complex modulation schemes with high signal PAPR and large bandwidths pose significant challenges for the performance of a DPD system. The performance of a DPD system may be enhanced by using higher sampling rates; however, minimizing the complexity cost may be a challenge. Indeed, a need exists for a DPD scheme that provides increased performance with minimal increase in complexity.

For at least one or more of these reasons, or one or more other reasons, it would be advantageous if new or improved systems could be developed, and/or improved methods of operation or implementation could be developed, so as to address any one or more of the concerns discussed above or to address one or more other concerns or provide one or more benefits.

DETAILED DESCRIPTION

The present disclosure in at least some embodiments relates to methods and systems that employ advanced behavioral modeling solutions so as to improve the performance of existing state-of-the-art architectures for power amplifier (PA) characterization and digital predistortion (DPD), including ones based on generalized memory polynomials. At least some such embodiments particularly relate to methods and systems that involve modeling secondary mixing effects in the PAs. Further, at least some such embodiments encompassed herein may outperform the high-order Volterra kernels that are conventionally used for enhancing the accuracy of underperforming standard models of regular complexity. Additionally, at least some embodiments encompassed herein employ new modeling approaches that rely upon much smaller computational complexities, and/or have simpler and less ambiguous pruning requirements, than conventional modeling approaches. In at least some such embodiments, these new modeling approaches make possible the modeling of secondary mixing products at the PA output and have physical meaning that may be visualized in frequency domain as amplitude and phase ripple. The application domains for at least some of the embodiments encompassed herein include, for example, output power devices, PAs and transmitter (Tx) front-end products.

Figure 1:
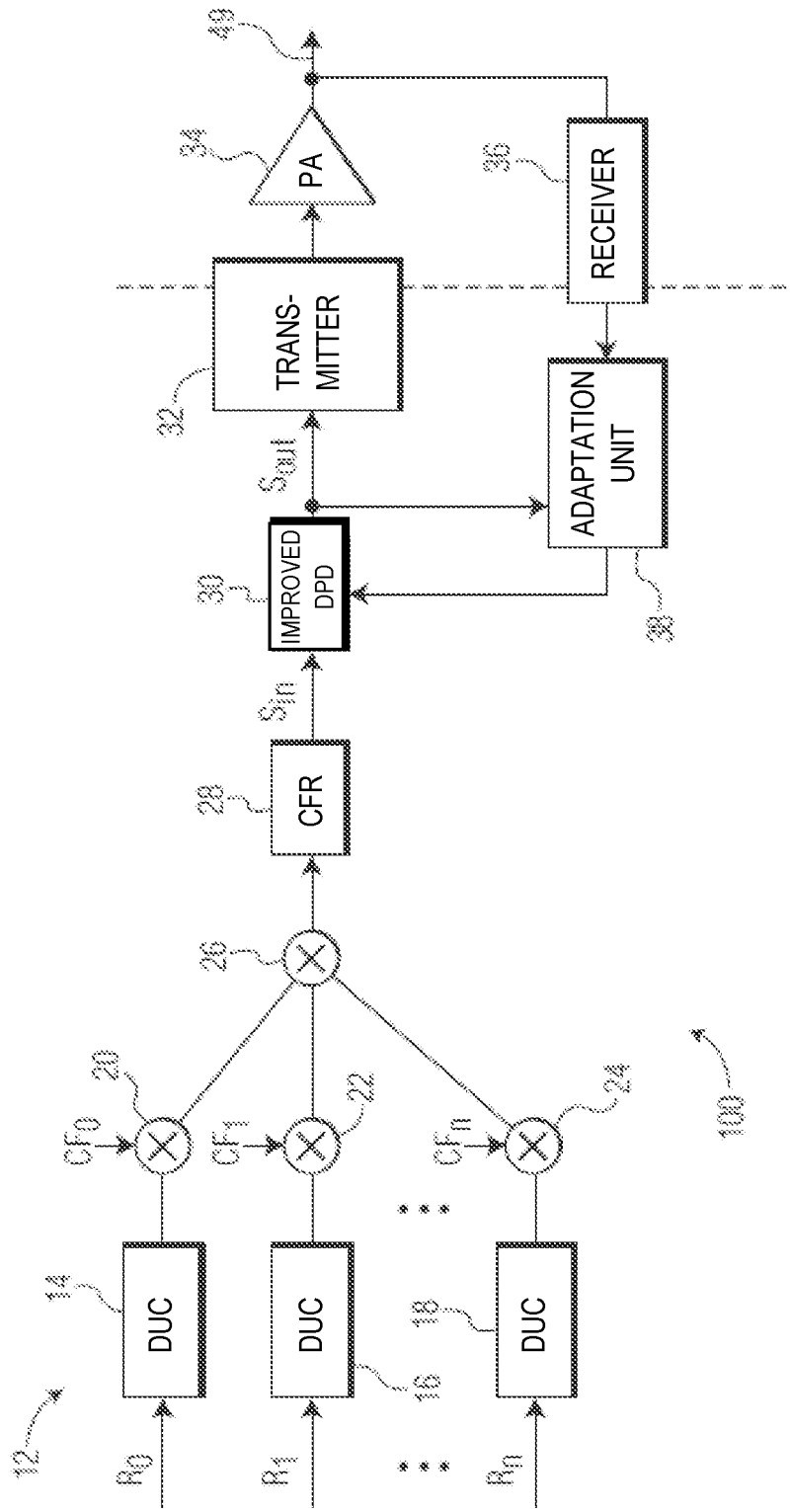
FIG. 1 illustrates, in block diagram form, a digital front-end for a transmitter incorporating digital predistortion (DPD) in accordance with an example embodiment.

Referring to FIG. 1, a block diagram is provided to schematically illustrate a digital front-end 100 for a transmitter incorporating DPD in accordance with an embodiment. In one embodiment, the digital front-end 100 is implemented on a single integrated circuit. The digital front-end 100 includes a digital up conversion (DUC) block 12, a crest factor reduction (CFR) block 28, a digital predistortion (DPD) block 30, a transmitter (TX) 32, a power amplifier (PA) 34, an observation receiver (RX) 36, and an adaptation unit 38 (where an analog-to-digital converter is also included within the RX 36). The digital up conversion block 12 includes a plurality of DUC elements represented by DUC elements 14, 16, and 18, mixers 20, 22, and 24, and a combining element 26. A vertical dashed line marks the demarcation between digital circuitry on the left side and analog circuitry on the right side of the dashed line. Note that the dashed line goes through the transmitter 32 indicating that part of the transmitter 32 is digital and part is analog. Also, the dashed line may pass through the observation receiver 36 indicating that part of the observation receiver is digital and part is analog.

In the digital front-end 100, a plurality of baseband signals labeled $R_0$-$R_n$ are provided to inputs of each of the DUC elements 14, 16, and 18. Each of the input baseband signals may have a different sample rate. The DUC elements up sample the baseband signals and provide output signals having a uniform output sample rate equal to R samples per second (sps). The mixers 20, 22, and 24 mix the DUC output signals with $CF_0$-$CF_n$, which are complex sinusoids corresponding to the center frequency of each respective carrier. The outputs of the mixers 20, 22, and 24 are provided to the combining element 26. In the illustrated embodiment, the combining element 26 is an adder and provides a composite signal to an input of the CFR block 28. The crest factor reduction block 28 provides a signal labeled $S_{in}(n)$ having a base sample rate R sps to DPD block (or module) 30. The signal labeled $S_{in}(n)$ is the input signal to the DPD block 30, and may also be referred to herein as a signal u(n). The DPD block 30 will be described in more detail below.

A predistorted transmit signal $S_{out}(n)$ is output by the DPD block 30 and is provided to the transmitter 32, and may also be referred to herein as a signal y(n). The output signal $S_{out}(n)$ is predistorted as described herein to compensate for the non-linearities of the power amplifier and memory effects. The transmitter 32 has an output connected to an input of the PA 34. The PA 34 is a conventional power amplifier. An output of the PA 34 is connected to an antenna (not shown) by way of an output node 49. The observation receiver 36 has an input connected to the output of the PA 34, and an output. The adaptation unit 38 has an input connected to the output of the RX 36, and an output for providing a DPD TUNING signal to a control input of the DPD block 30. The DPD TUNING signal comprises, for example, DPD parameters. The adaptation unit 38 monitors the output of the PA 34 and controls the predistortion model of the DPD block 30 in response to changes in the output of the PA 34. For example, non-linearities in the output signal of the PA 34 may change due to, for example, changing operating conditions such as changing temperature.

In at least some embodiments encompassed herein, the DPD block 30 utilizes an improved DPD technique involving a modified form of the Volterra series approximation tool. It will be recognized that the Volterra series is a powerful nonlinear approximation tool, which has been applied successfully to baseband behavioral modeling of high-power PAs. One of its most generic forms applicable to PAs is listed below in Equation (1), which shows the general Volterra series for approximation of baseband PA output y(n) as a sum of products of the baseband input u(n) (also known as the behavioral Volterra PA model):

$$y(n) = \sum_{p=0}^{P} \sum_{i_0=0}^{T_0} \cdots \sum_{i_p=0}^{T_p} \quad (1)$$

$$h_p(i_0, i_1 \ldots i_p) \prod_{j=0}^{\frac{p}{2}} u(n-i_j) \prod_{j=\frac{p}{2}+1}^{p} u(n-i_j)^*$$

for $P \in \{0, 2, 4 \ldots$ even integers$\}$, and where $h_p(i_0, i_1 \ldots i_p)$ is the $p^{th}$ order Volterra kernel providing coefficients to weigh the products composed of differently offset baseband input signal samples $u(n-i_j)$ and conjugated input signal samples $u(n-i_j)^*$ before they are summed up to construct the output signal y(n). With respect to utilization of this general Volterra series, the key requirement is that the number of conjugated baseband multiplicands is one less than the non-conjugated ones.

The performance of the formula shown by Equation (1) is excellent especially with split carrier signals, but its implementation complexity is large and, hence, it is not widely used in DPD models for PA linearization. A simplification is possible by replacing the balanced out conjugated and non-conjugated samples with envelope values as in Equation (2), which represents the simplification of the product format using an envelope instead of conjugated baseband signals:

$$\prod_{j=0}^{\frac{p}{2}} u(n-i_j) \prod_{j=\frac{p}{2}+1}^{p} u(n-i_j)^* \to u(n-i_1) \prod_{j=2}^{p} |u(n-i_j)| \quad (2)$$

where $|u(n-i_j)|$ represents the absolute value of the baseband $\{I,Q\}$ signal sample also known as envelope (the phase information is excluded). The performance of this approximation formula is at par with the general format of Equation (1) in terms of producing output samples in time domain. The original generalized formula has the advantage of modeling specific IMD products (IMDs) around the main carriers while the new format provides a powerful lumped approximation of the effect of all IMDs superimposed at the output. The benefit of reformatting of the double product terms in Equation (1) is significant, because the multiplication in the product series is real-valued and four times simpler than the original. Equation (2) allows for modeling and correction of difficult residual distortion.

Additionally, the selection of the elements in the product series of Equation (2) may be organized in a manner shown in Equation (3), which particularly shows high-order Volterra terms (of order p) represented as product series with the key parameters being the time offsets $i_j$:

$$\langle \text{High order Volterra term of order } p \rangle := u(n-i_0) \prod_{j=1}^{p} |u(n-i_j)|, \quad (3)$$

$$p \geq 2$$

where the time offset specification (TO) is defined as a set of real numbers $$TO = \{i_p i_{p-1} \ldots i_1 i_0\} \quad (4)$$

and where each of the following requirements is met: (a) p>=2, i.e. at least 3-element sets are allowed (as described further below, certain cases are excluded); (b) the first p elements do not have identical values (again, as described further below, certain cases are excluded); (c) the number of elements minus one equals the order p of the term; (d) each of the first p elements in the set determines the time delay of an envelope sample in the product series $|u(n-i_j)|$, $j=1 \ldots p$; and (e) the last p+1 element is the baseband sample with its delay $|u(n-i_0)|$.

Additionally, a generalized polynomial form of the Standard Volterra series for behavioral modeling of nonlinearities in radio frequency (RF) hardware (HW) is represented by Equation (4) below. In this regard, it should be appreciated that the terms not covered by Equation (3) fall into the category of polynomial terms when $p \geq 2$ and the TO sets have identical values:

$$y(n) = \sum_{p=0}^{P} \sum_{i_1=0}^{T_1} \sum_{i_2=0}^{T_2} h_p(i_1, i_2) u(n-i_1) |u(n-i_2)|^p \quad (5)$$

Further, a canonical form of Equation (4) is more often used because it has more suitable and structured description, which may be linked to physical properties of PAs. More particularly, the canonical form of the Standard Volterra series for PA and DPD modeling after grouping the time lags of the input samples and envelope may be represented as follows in Equation (6):

$$y(n) = SP + MP + CP \quad (6)$$

In Equation (6), y(n) is defined as the sum of static polynomial kernels (SP), main memory polynomial kernels (MP), and cross-term memory polynomials (CP), where the cross-term memory polynomials include each of type CT-B kernels and type CT-C kernels (the maximum depth of the lags l, LB and LC, may be very different for each). SP, MP, and CP respectively are defined below in Equations (7), (8), and (9), respectively:

$$SP = u(n) \sum_{p=0}^{P_S} S_p |u(n)|^p \quad (7)$$

$$MP = \sum_{m=1}^{M} u(n-m) \sum_{p=0}^{P_M} M_{q,p} |u(n-m)|^p \quad (8)$$

$$CP = \sum_{l=0}^{LB} \left( \sum_{q=1}^{Q} u(n-l) \sum_{p=1}^{P_{CT_B}} CT_{q,p} |u(n-l-q)|^p \right) + \quad (9)$$

$$\sum_{l=0}^{LC} \left( \sum_{r=1}^{R} u(n-l-r) \sum_{p=1}^{P_{CT_C}} CT_{r,p} |u(n-l)|^p \right)$$

Equation (6), with the three sets of terms as further defined in Equations (7), (8), and (9), constitutes the mathematical definition of the Volterra Generalized Memory Polynomials (GMP) approximation used widely in state-of-the-art DPD systems. The breakdown into several types of polynomial kernels allows for systematic approach to pruning for individual use-cases and applications. The goal is to find the minimal polynomial order and time lags which provide for an approximation of the PA output or its inverse to meet a certain level of performance. Eliminating the need for an entire type of kernels may bring the most significant benefits.

The full Volterra model may be represented by an Equation (10), which is composed of the terms from Equations (3) and (6):

$$y(n) = \sum_{p=0}^{P_{GMP}} \sum_{j_1=0}^{T_1} \sum_{j_2=0}^{T_2} h_p(j_1, j_2) u(n-j_1) |u(n-j_2)|^p + \quad (10)$$

$$\sum_{p=2}^{P_{HighOrder}} \sum_{i_0=0}^{D_1} \ldots \sum_{i_p=0}^{D_p} h_p(i_0, i_1, i_2 \ldots i_p) u(n-i_0) \prod_{j=1}^{p} |u(n-i_j)|$$

where $P_{HighOrder} \geq 2$ and $i_0 = i_1 = i_2 \ldots = i_p$ is NOT an element of $\{i_0, i_1, i_2 \ldots i_p\}$.

Equation (10) is powerful and may approximate subtle memory effects. The first order (common) nonlinearity and memory effects are addressed by the GMP sum (GMP kernels), which is the first term of the sum of terms of Equation (10) above (on the right side of the equality, preceding the "+" sign). The difficult to measure and correct for second order effects are approximated by the high-order sum (high-order Volterra kernels), which is the second term of the sum of terms of Equation (10) above (on the right side of the equality, after the "+" sign).

A significant challenge associated with implementing a model/architecture for DPD utilizing the Equation (10) is the management of complexity by the pruning of terms in the respective kernels, which is done experimentally for a given PA. According to Equation (6) (including the terms defined by Equations (7), (8), and (9)), the pruning process for the GMP kernels has 9 degrees of freedom, with 4 power and 5 time-offset parameters, namely: $\{P_S, P_M, P_{CT_B}, P_{CT_B}\}$, $\{M, LB, LC, R, Q\}$.

Further, the pruning of the high-order terms is much more complex with more degrees of freedom because of the combinatorial nature of the involved product series (e.g., as described in regard to Equation (5) above). Boundary conditions such as "order and memory fading" and "dynamic deviation reduction" have been proposed as an attempt to enforce a form of order in the term selection process. However, regardless of the simplification strategies, the high-order terms of Equation (10) remain heuristic and purely mathematical. It is difficult to translate the kernel coefficients to meaningful memory effects. Intuitively, a sum of delayed and weighed by coefficients signal values is a filter, but the mechanically introduced product series of time-delayed envelope and signal offsets is not close to the classic definition of digital filters. This poses an issue for developing DPD models. Also, visualization in the frequency domain as frequency responses is not possible, which is significant for PA modeling.

Therefore, notwithstanding the merits of the aforementioned options/techniques for implementing Volterra GMP models for DPD in relation to PAs, it remains challenging to address various terms—and particularly the high-order terms—of such models. In view of these considerations, in accordance with at least some embodiments of the present disclosure, additional options/techniques are implemented. In at least some such embodiments, the high-order Volterra terms of Equation (10) are replaced with a simpler but equally (or substantially equally) effective model, which may be constrained by a few physical boundary conditions similarly to the GMP terms. Also, at least some such embodiments are directed toward achieving a goal of finding a manner of representing more efficiently the processes of high-order distortion generation in the PA, which is often the reason for significant residual approximation errors that remain even after applying the most complex GMP terms (something with respect to which the high-order Volterra terms may be highly effective at modeling, but in a manner that may be obscure and complicated).

In at least some embodiments encompassed herein, an improved version of the Volterra GMP model is implemented in a manner that is enhanced by mixers with memory, which act as high-order Volterra terms. At a high conceptual level, such a mixer-enhanced Volterra GMP model involves wrapping a mixing module around the GMP model (or, in other embodiments, wrapping a mixing module around other nonlinear model(s)), which approximates the main nonlinear memory of the PA, and the added blocks will take care of the residual distortion ignored by the GMP terms.

Figure 3:
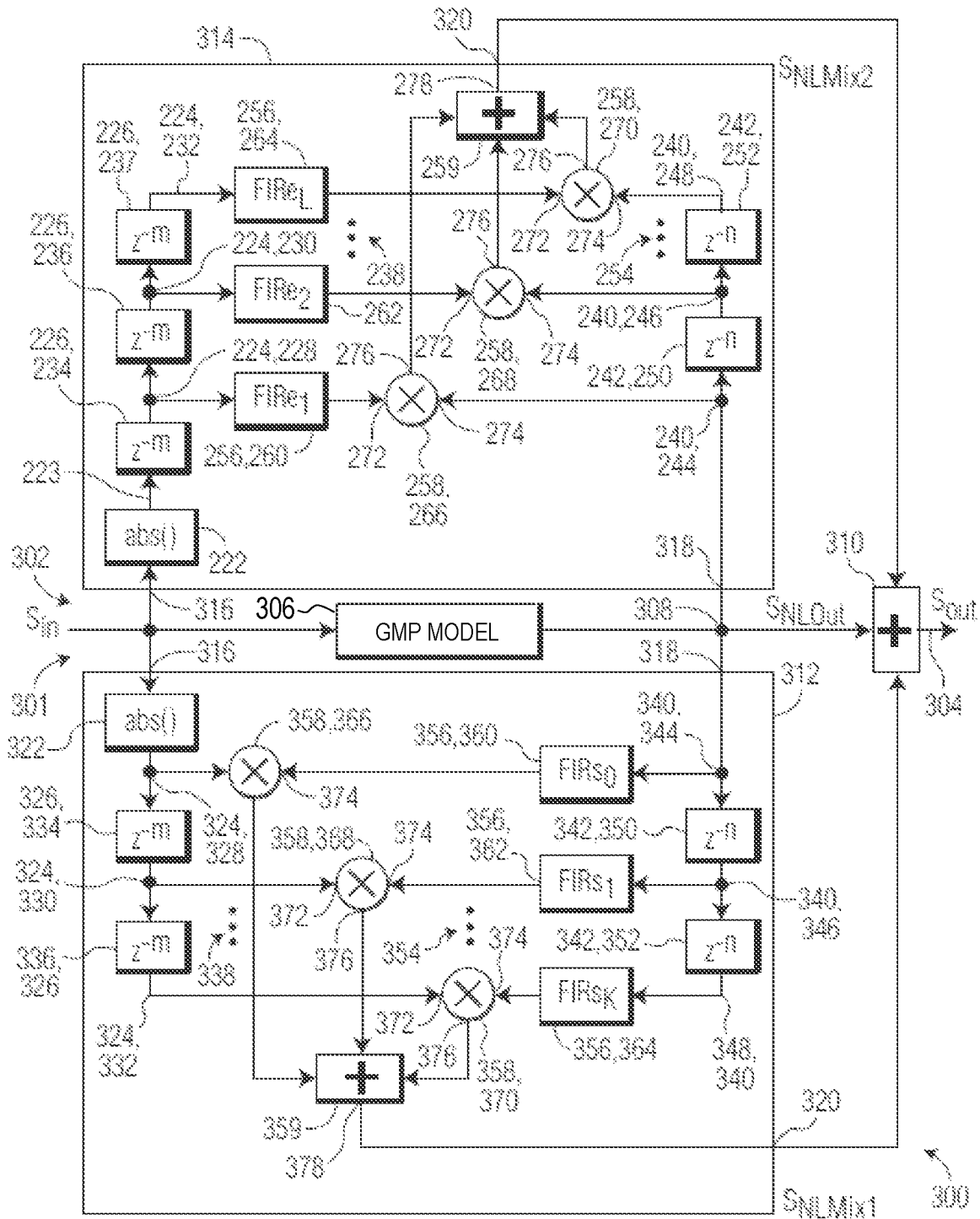

More particularly, in accordance with at least some such embodiments, FIG. 3 provides a block diagram 300 to illustrate schematically a mixer-enhanced Volterra GMP model, as may be implemented to perform DPD processing in the DPD block 30 of the digital front-end 100 of FIG. 1. As shown in FIG. 3, the block diagram 300 includes an input port 302 at which a baseband GMP model input signal (or samples) $S_{in}$ is received, and an output port 304 at which an output signal (or samples) $S_{out}$ is output. The input port 302 is coupled to the output port 304 by several processing paths. First, a GMP model block 306 is coupled between the input port 302 and an intermediate node 308, and a summation block 310 is coupled between the intermediate node 308 and the output port 304. It should be appreciated that the GMP model block 306 may operate in a conventional manner, and generate an intermediate signal at the intermediate node 308 based upon the input signal ($S_{in}$) received at the input port 302. The intermediate signal generated at the GMP model block 306 may be considered a nonlinear GMP model output signal ($S_{NLOut}$). The GMP model block 306, in combination with the input port 302 and the intermediate node 308 (and/or possibly additionally in combination with the summation block 310 and output port 304), may also be referred to as a primary model section or block 301.

Additionally, the block diagram 300 also includes a first mixer block 312 and a second mixer block 314. Each of the first mixer block 312 and second mixer block 314 includes a respective first input terminal 316 that is coupled directly to the input port 302 so as to receive the input signal ($S_{in}$), a respective second input terminal 318 that is coupled directly to the intermediate node 308 so as to receive the intermediate signal output by the GMP model block 306, and a respective output terminal 320 that is coupled directly to the summation block 310. Thus, the first mixer block 312 and the second mixer block 314 are effectively coupled in parallel with one another—and with the GMP model block 306 and/or the primary model section 301—between the input port 302 and the intermediate node 308, and also are effectively coupled in parallel with one another between the intermediate node 308 and the summation block 310. Further, the output signal (or samples) $S_{out}$ that is output by the summation block 310 at the output port 304 is equal to (or based upon) the sum of each of (a) the intermediate signal generated by the GMP model block 306 at the intermediate node 308, which is the nonlinear GMP model output signal ($S_{NLOut}$), (b) a first mixer block output signal provided at the respective output terminal 320 of the first mixer block 312, and (c) a second mixer block output signal provided at the respective output terminal 320 of the second mixer block 314.

The mixer blocks 312 and 314 serve to replace the functionality of the high-order Volterra kernels and may outperform them for the same number of terms. More particularly as shown in FIG. 3, the first mixer block 312 includes an envelope input block 322 that is coupled between the respective first input terminal 316 of the first mixer block and a series of output nodes 324 and a series of first tapped delay lines 326 respectively coupling respective sequential pairs of the output nodes, with the number of first tapped delay lines being one less than the number of output nodes. In the present example, the series of output nodes 324 includes first, second, and third output nodes 328, 330, and 332, respectively, where the first output node 328 is the output port of the envelope input block 322 at which that envelope input block provides an envelope input signal abs(s) based upon the input signal ($S_{in}$). Further, in the present example, the series of first tapped delay lines 326 includes first and second ones 334 and 336, respectively, each of which provides a delay of $Z^{-m}$. The first one 334 links the first output node 328 with the second output node 330 and the second one 336 links the second output node 330 with the third output node 332. However, as indicated by an ellipsis 338, any arbitrary number of the output nodes and any arbitrary number of the first tapped delay lines (typically less than the number of output nodes by one) may be present in other embodiments.

Additionally, the first mixer block 312 includes a series of additional nodes 340 and a series of second tapped delay lines 342. In the present example, the series of additional nodes 340 includes first, second, and third additional nodes 344, 346, and 348, respectively, where the first additional node 340 is coupled directly to (and constitutes the same electrical node as) the respective second input terminal 318 of the first mixer block 312. Further, in the present example, the series of second tapped delay lines 342 includes first and second ones 350 and 352, respectively, each of which provides a delay of $Z^{-n}$. The first one 350 links the first additional node 344 with the second additional node 346 and the second one 352 links the second additional node 346 with the third additional node 348. However, as indicated by an ellipsis 354, any arbitrary number of the additional nodes and any arbitrary number of the second tapped delay lines (typically less than the number of output nodes by one) may be present in other embodiments.

Further, the first mixer block 312 includes a series of type 1 mixing filters 356, a series of multiplication blocks 358, and an additional summation block 359. In the present example, the series of type 1 mixing filters 356 includes first, second, and third type 1 mixing filters 360, 362, and 364, and the series of multiplication blocks 358 includes first, second, and third multiplication blocks 366, 368 and 370, respectively. Nevertheless, again as represented by the ellipsis 354 and the ellipsis 338, in other embodiments any arbitrary number of the type 1 mixing filters may be present in the series of type 1 mixing filters 356, and any arbitrary number of the multiplication blocks may be present in the series of multiplication blocks 358. In the present embodiment, each of the type 1 mixing filters 356 is a finite impulse response filter (FIR), and the first, second, and third type 1 mixing filters 360, 362, and 364 may also respectively be referred to as $FIRs_0$, $FIRs_1$, and $FIRs_K$ (in this example, where K=3) blocks.

In the present embodiment, each of the multiplication blocks 358 includes a respective first input port 372, a respective second input port 374, and a respective output port 376. The respective first input ports 372 are respectively directly coupled to respective ones of the output nodes 324, the respective second input ports 374 are respectively indirectly coupled to respective ones of the additional nodes 340 by way of respective ones of the type 1 mixing filters 356, and each of the respective output ports 376 of each of the multiplication blocks 358 is coupled directly to the additional summation block 359. More particularly, in the present example embodiment, the respective first input ports 372 of the first, second, and third multiplication blocks 366, 368, and 370, respectively, are respectively directly coupled to (and respectively constitute the same respective nodes as) the first, second, and third output nodes 328, 330, and 332, respectively. Also, the respective second input ports 374 of the first, second, and third multiplication blocks 366, 368, and 370, respectively, are respectively indirectly coupled to the first, second, and third additional nodes 344, 346, and 348, respectively, by way of the first, second, and third type 1 mixing filters 360, 362, and 364, respectively.

Additionally, each of the respective multiplication blocks 358 operates to provide, at the respective output port 376 of the respective multiplication block, a respective intermediate signal that is the respective product of the respective signals received at the respective first input port 372 and respective second input port 374 of the respective multiplication block. Given that each of the respective output ports 376 of each of the multiplication blocks 358 is coupled to the additional summation block 359, the additional summation block receives each of the respective intermediate signals output by each of the respective multiplication blocks. The additional summation block 359 then additionally generates a summation output signal at an summation block output port 378 of the additional summation block. In the present embodiment, the summation block output port 378 is directly coupled to (and constitutes the same node as) the respective output terminal 320 of the first mixer block 312, and so the summation output signal at the summation block output port 378 is provided as the first mixer block output signal to the summation block 310.

As for the second mixer block 314, that mixer block includes an envelope input block 222 that is coupled between the respective first input terminal 316 of the second mixer block and an envelope output node 223, at which that envelope input block provides an envelope input signal abs(s) based upon the input signal ($S_{in}$). The envelope output node 223 in turn is coupled to a series of further output nodes 224 and a series of third tapped delay lines 226 respectively coupling respective sequential pairs of the output nodes including the envelope output node 223 and the further output nodes 224, with the number of third tapped delay lines 226 being equal to the number of further output nodes 224. In the present example, the series of further output nodes 224 includes first, second, and third further output nodes 228, 230, and 232, respectively, and the series of third tapped delay lines 226 includes first, second, and third ones 234, 236, and 237, respectively, each of which provides a delay of $Z^{-m}$. The first one 234 of the third tapped delay lines 226 links the envelope output node 223 with the first further output node 228, the second one 236 of the third tapped delay lines links the first further output node 228 with the second further output node 230, and the third one 237 of the third tapped delay lines links the second further output node 230 with the third further output node 232. As indicated by an ellipsis 238, any arbitrary number of the further output nodes 224 and any arbitrary number of the third tapped delay lines 226 (typically equal in number to the number of the further output nodes) may be present in other embodiments.

Additionally, the second mixer block 314 includes a series of additional nodes 240 and a series of fourth tapped delay lines 242. In the present example, the series of additional nodes 240 includes first, second, and third additional nodes 244, 246, and 248, respectively, where the first additional node 244 is coupled directly to (and constitutes the same electrical node as) the respective second input terminal 318 of the second mixer block 314. Further, in the present example, the series of fourth tapped delay lines 242 includes first and second ones 250 and 252, respectively, each of which provides a delay of $Z^{-n}$. The first one 250 links the first additional node 244 with the second additional node 246 and the second one 252 links the second additional node 246 with the third additional node 248. However, as indicated by an ellipsis 254, any arbitrary number of the additional nodes 240 and any arbitrary number of the fourth tapped delay lines 242 (typically less than the number of additional nodes by one) may be present in other embodiments.

Further, the second mixer block 314 includes a series of type 2 mixing filters 256, a series of multiplication blocks 258, and an additional summation block 259. In the present example, the series of type 2 mixing filters 256 includes first, second, and third type 2 mixing filters 260, 262, and 264, and the series of multiplication blocks 258 includes first, second, and third multiplication blocks 266, 268 and 270, respectively. Nevertheless, again as represented by the ellipsis 238 and the ellipsis 254, in other embodiments any arbitrary number of the type 2 mixing filters may be present in the series of type 2 mixing filters 256, and any arbitrary number of the multiplication blocks may be present in the series of multiplication blocks 258. In the present embodiment, each of the type 2 mixing filters 256 is a finite impulse response filter (FIR), and the first, second, and third type 2 mixing filters 260, 262, and 264 may also respectively be referred to as $FIRe_1$, $FIRe_2$, and $FIRe_L$ (in this example, where L=3) blocks.

In the present embodiment, each of the multiplication blocks 258 includes a respective first input port 272, a respective second input port 274, and a respective output port 276. The respective second input ports 274 are respectively directly coupled to respective ones of the additional nodes 240, the respective first input ports 272 are respectively indirectly coupled to respective ones of the further output nodes 224 by way of respective ones of the type 2 mixing filters 256, and each of the respective output ports 276 of each of the multiplication blocks 258 is coupled directly to the additional summation block 259. More particularly, in the present example embodiment, the respective second input ports 274 of the first, second, and third multiplication blocks 266, 268, and 270, respectively, are respectively directly coupled to (and respectively constitute the same respective nodes as) the first, second, and third additional nodes 244, 246, and 248, respectively. Also, the respective first input ports 272 of the first, second, and third multiplication blocks 266, 268, and 270, respectively, are respectively indirectly coupled to the first, second, and third further output nodes 228, 230, and 232, respectively, by way of the first, second, and third type 2 mixing filters 260, 262, and 264, respectively.

Additionally, each of the respective multiplication blocks 258 operates to provide, at the respective output port 276 of the respective multiplication block, a respective intermediate signal that is the respective product of the respective signals received at the respective first input port 272 and respective second input port 274 of the respective multiplication block. Given that each of the respective output ports 276 of each of the multiplication blocks 258 is coupled to the additional summation block 259, the additional summation block receives each of the respective intermediate signals output by each of the respective multiplication blocks. The additional summation block 259 then generates a summation output signal at an summation block output port 278 of the additional summation block. In the present embodiment, the summation block output port 278 is directly coupled to (and constitutes the same node as) the respective output terminal 320 of the second mixer block 314, and so the summation output signal at the summation block output port 278 is provided as the second mixer block output signal to the summation block 310.

Operation of a DPD module in accordance with the mixer-enhanced Volterra GMP model illustrated by the block diagram 300 of FIG. 3 may be further understood as follows. Primary mixing of envelope and IQ (in-phase quadrature) signals takes place in the GMP model (e.g., the GMP model 306) in the SP, MP and CT-B/CT-C(CP) kernels (e.g., as described respectively in regard to Equations (7), (8), and (9) above, respectively). Each of these kernels mixes the signal envelope passed through a non-linear function with the IQ signal. The two mixing products may be offset in time between each other (CT-B/CT-C) or with the same delay (SP and MP). The cumulative effect of all first-order mixing processes is well approximated by the GMP terms.

Additionally, secondary mixing is introduced by multiplying the output of the GMP model (e.g., the intermediate signal at the intermediate node 308) with the envelope of the input signal (abs(s)). There is always a non-zero time-offset between the two mixing signals after one or the other is passed through a tapped delay line (e.g., providing one or more of the $Z^{-n}$ or $Z^{-m}$ time delays) and then a finite impulse response filter (FIR) (e.g., any of $FIRs_0$, $FIRs_1$, and $FIRs_K$ $FIRe_1$, $FIRe_2$, and $FIRe_L$ as described above). The mixing options are grouped in two types of mixers, namely, (1) the Type 1 mixer (e.g., the first mixer block 312) implements modulation of past delayed and filtered GMP output samples by more recent copies of the input envelope (e.g., current envelope mixes with past output), and (2) the Type 2 mixer (e.g., the second mixer block 314) implements modulation of more recent GMP output samples by past filtered copies of the input envelope (e.g., past envelope mixes with current output).

Although both the Type 1 mixer (e.g., the first mixer block 312) and also the Type 2 mixer (e.g., the second mixer block 314) are included in the mixer-enhanced Volterra GMP model illustrated by the block diagram 300, in other embodiments only one of the two types of mixers may be present. Indeed, although in some embodiments such as the present embodiment of FIG. 3, both of the first mixer block 312 and the second mixer block 314 are present (and operate simultaneously), in other embodiments only one of the first mixer block 312 and the second mixer block 314 is present. In determining which of the Type 1 and Type 2 mixers should be implemented in any given case, it should be recognized that the Type 1 mixer is the main extension to GMP kernels (e.g., as provided by the GMP model 306) and, by comparison, the Type 2 mixer may be optionally added for extra modeling power. Also, it should be appreciated that each of the Type 1 mixer and Type 2 mixer (e.g., corresponding to the first mixer block 312 and second mixer block 314, respectively) may be configured independently. Further, both of the Type 1 and Type 2 mixers (e.g., both types of mixing modules corresponding to the first mixer block 312 and second mixer block 314) are scalable in terms of delay line depths and FIR filter lengths. Longer and more complex nonlinear memory effects are modeled by extending the length of the abovementioned functional elements.

In addition to the mixer-enhanced Volterra GMP model illustrated by the block diagram 300 of FIG. 3, the present disclosure is intended to encompass a variety of additional forms or types of mixer-enhanced Volterra GMP models. In at least some such embodiments, the mixer-enhanced Volterra GMP models again as in the block diagram 300 of FIG. 3 include the primary model section 301 in combination with one or more additional types (or forms) of mixer blocks. However, in such embodiments, the mixer-enhanced Volterra GMP models not only include the input port 302, GMP model block 306, and intermediate node 308, as well as the output port 304 and summation block 310 but, rather than employing the combination of the first mixer block 312 and the second mixer block 314 coupled in parallel, instead include one or more additional types (or forms) of mixer blocks. Such one or more additional types of mixer blocks, when implemented in combination with the input port 302, output port 304, GMP model block 306, intermediate node 308, and summation block 310 may also be implemented to perform DPD processing in the DPD block 30 of the digital front-end 100 shown in FIG. 1.

Figure 4:
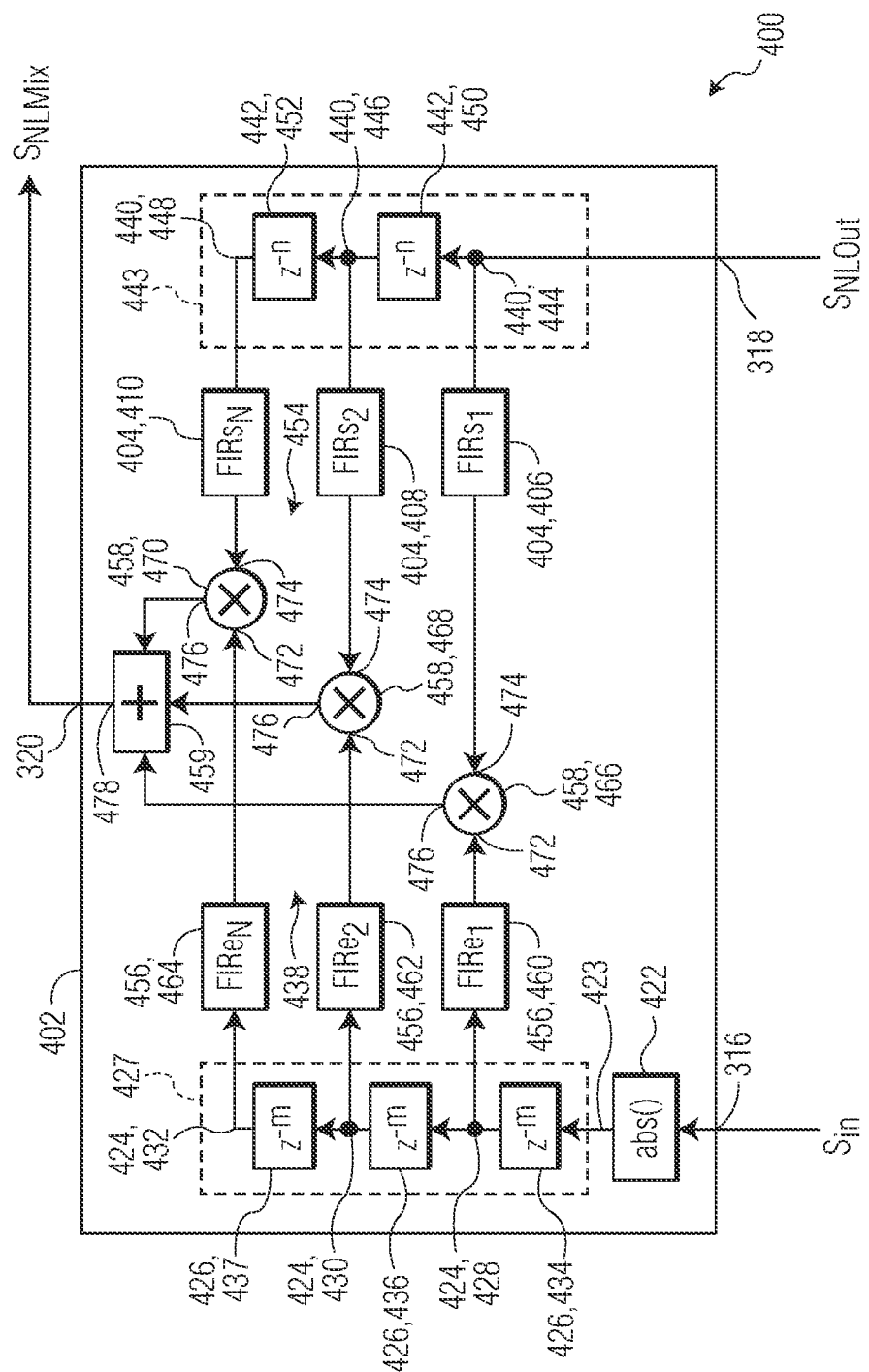

Further in this regard, FIG. 4 provides a block diagram 400 to illustrate schematically a first additional mixer block 402, where the first additional mixer block serves as a mixer array with memory replacing the high-order Volterra terms. As with the first mixer block 312 and the second mixer block 314, the first additional mixer block 402 includes a respective first input terminal 316 by which the first additional mixer block may be coupled directly to the input port 302 so as to receive the baseband GMP model input signal ($S_{in}$), a respective second input terminal 318 by which the first additional mixer block may be coupled directly to the intermediate node 308 so as to receive the intermediate signal output by the GMP model block 306, and a respective output terminal 320 by which the first additional mixer block may be coupled directly to the summation block 310. Thus, when employing the first additional mixer block 402, a mixer-enhanced Volterra GMP model may be formed by the combination of that first additional mixer block along with each of the input port 302, output port 304, GMP model block 306, intermediate node 308, and summation block 310 of the primary model section 301 shown in FIG. 3. In such an embodiment, the output signal (or samples) $S_{out}$ that is output by the summation block 310 at the output port 304 is equal to (or based upon) the sum of each of (a) the intermediate signal generated by the GMP model block 306 at the intermediate node 308, which is the nonlinear GMP model output signal ($S_{NLOut}$), and (b) a first additional mixer block output signal ($S_{NLMix}$) provided at the respective output terminal 320 of the first additional mixer block 402 (which provides added terms to the GMP model). Thus, in this embodiment, the summation block 310 generates the output signal $S_{out}$ based upon two input signals rather than three input signals as in the embodiment of FIG. 3.

More particularly as shown in FIG. 4, the first additional mixer block 402 includes an envelope input block 422 that is coupled between the respective first input terminal 316 of the first additional mixer block and an envelope output node 423, at which that envelope input block provides an envelope input signal abs(s) based upon the input signal ($S_{in}$). The envelope output node 423 in turn is coupled to a series of further output nodes 424 and a series of first tapped delay lines 426 respectively coupling respective sequential pairs of the output nodes including the envelope output node 423 and the further output nodes 424, with the number of first tapped delay lines 426 being equal to the number of further output nodes 424. The combination of the envelope output node 423, further output nodes 424, and series of first tapped delay lines 426 may be referred to as an input tapped delay line 427.

In the present example, the series of further output nodes 424 includes first, second, and third further output nodes 428, 430, and 432, respectively, and the series of first tapped delay lines 426 includes first, second, and third ones 434, 436, and 437, respectively, each of which provides a delay of $Z^{-m}$. The first one 434 of the first tapped delay lines 426 links the envelope output node 423 with the first further output node 428, the second one 436 of the first tapped delay lines links the first further output node 428 with the second further output node 430, and the third one 437 of the first tapped delay lines links the second further output node 430 with the third further output node 432. As indicated by an ellipsis 438, any arbitrary number of the further output nodes 424 and any arbitrary number of the first tapped delay lines 426 (typically equal in number to the number of the further output nodes) may be present in other embodiments.

Additionally, the first additional mixer block 402 includes a series of additional nodes 440 and a series of second tapped delay lines 442. The combination of the series of additional nodes 440 and the series of second tapped delay lines 442 may be referred to as an output tapped delay line 443. In the present example, the series of additional nodes 440 includes first, second, and third additional nodes 444, 446, and 448, respectively, where the first additional node 444 is coupled directly to (and constitutes the same electrical node as) the respective second input terminal 318 of the first additional mixer block 402. Further, in the present example, the series of second tapped delay lines 442 includes first and second ones 450 and 452, respectively, each of which provides a delay of $Z^{-n}$. The first one 450 links the first additional node 444 with the second additional node 446 and the second one 452 links the second additional node 446 with the third additional node 448. However, as indicated by an ellipsis 454, any arbitrary number of the additional nodes 440 and any arbitrary number of the second tapped delay lines 442 (typically less than the number of output nodes by one) may be present in other embodiments.

Further, the first additional mixer block 402 includes a series of type 1 mixing filters 404, a series of type 2 mixing filters 456, a series of multiplication blocks 458, and a summation block 459. In the present example, the series of type 1 mixing filters 404 includes first, second, and third type 1 mixing filters 406, 408, and 410, respectively, the series of type 2 mixing filters 456 includes first, second, and third type 2 mixing filters 460, 462, and 464, respectively, and the series of multiplication blocks 458 includes first, second, and third multiplication blocks 466, 468 and 470, respectively. Additionally, in the present embodiment, each of the type 1 mixing filters 404 is a finite impulse response filter (FIR), and the first, second, and third type 1 mixing filters 406, 408, and 410 may also respectively be referred to as $FIR_{s1}$, $FIR_{s2}$, and $FIRs_N$ (in this example, where N=3) blocks. Also, each of the type 2 mixing filters 456 is a finite impulse response filter (FIR), and the first, second, and third type 2 mixing filters 460, 462, and 464 may also respectively be referred to as $FIRe_1$, $FIRe_2$, and $FIRe_N$ (in this example, where N=3) blocks. Notwithstanding the above discussion, again as represented by the ellipsis 438 and the ellipsis 454, in other embodiments any arbitrary number of the type 1 mixing filters may be present in the series of type 1 mixing filters 404, any arbitrary number of the type 2 mixing filters may be present in the series of type 2 mixing filters 456, and any arbitrary number of the multiplication blocks may be present in the series of multiplication blocks 458.

In the present embodiment, each of the multiplication blocks 458 includes a respective first input port 472, a respective second input port 474, and a respective output port 476. The respective first input ports 472 are respectively indirectly coupled to respective ones of the further output nodes 424 by way of respective ones of the type 2 mixing filters 456, the respective second input ports 474 are respectively indirectly coupled to respective ones of the additional nodes 440 by way of respective ones of the type 1 mixing filters 404, and each of the respective output ports 476 of each of the multiplication blocks 458 is coupled directly to the summation block 459. More particularly, in the present example embodiment, the respective first input ports 472 of the first, second, and third multiplication blocks 466, 468, and 470, respectively, are respectively indirectly coupled to the first, second, and third further output nodes 428, 430, and 432, respectively, by way of the first, second, and third type 2 mixing filters 460, 462, and 464, respectively. Also, the respective second input ports 474 of the first, second, and third multiplication blocks 466, 468, and 470, respectively, are respectively indirectly coupled to the first, second, and third additional nodes 444, 446, and 448, respectively, by way of the first, second, and third type 1 mixing filters 406, 408, and 410, respectively.

Additionally, each of the respective multiplication blocks 458 operates to provide, at the respective output port 476 of the respective multiplication block, a respective intermediate signal that is the respective product of the respective signals received at the respective first input port 472 and respective second input port 474 of the respective multiplication block. Given that each of the respective output ports 476 of each of the multiplication blocks 458 is coupled to the summation block 459, the summation block receives each of the respective intermediate signals output by each of the respective multiplication blocks. The summation block 459 then additionally generates a summation output signal at an summation block output port 478 of the summation block. In the present embodiment, the summation block output port 478 is directly coupled to (and constitutes the same node as) the respective output terminal 320 of the first additional mixer block 402, and so the summation output signal at the summation block output port 478 is provided as the first additional mixer block output signal ($S_{NLMix}$) for receipt by the summation block 310 (e.g., which is shown in FIG. 3). In this manner, the first additional mixer block 402 generates and provides additional terms, in the form of the first additional mixer block output signal ($S_{NLMix}$), to supplement the intermediate signal generated by the GMP model block 306 at the intermediate node 308 (which is the nonlinear GMP model output signal, $S_{NLOut}$).

It should be appreciated from FIG. 4 that the primary functional block of the first additional mixer block (or mixing module) 402 (in addition to the GMP model as provided by GMP model block 306) includes two linear FIR filter arrays and two delay lines. In this example embodiment, all of the functional elements are complex-valued including the FIR filter coefficients. Further, both of the input signals that are provided to the first additional mixer block (that is, each of $S_{in}$ and $S_{NLOut}$) are complex-valued and are sourced from the GMP model. The first additional mixer block output signal ($S_{NLMix}$) is the additional complex-valued modulated baseband signal, which models secondary mixing effects that are normally represented with high-order Volterra terms. Additionally, it should be recognized that the configuration parameter set for the first additional mixer block 402 includes the input signals ($S_{in}$ and $S_{NLOut}$), the coefficients of the FIR filters (FIRe, FIRs), and the unit tap-delays of the delay lines ($Z^{-n}$, $Z^{-m}$). The identification or adaptation of all FIR filter coefficients is done using the separate mixer arrangement where the unknown FIR parameters are unique. The conversion from separate to combined format is straightforward due to the linear nature of the operations.

It should be further recognized that implementation of DPD by the first additional mixer block 402 shown in FIG. 4 may be more efficient than the implementation of DPD using the parallel combination of both of the first mixer block 312 (of Type 1) and the second mixer block 314 (of type 2) as described with reference to FIG. 3. This is because the mixing complex-valued multipliers are not repeated (as shown earlier). For this reason, use of the first additional mixer block 402, instead of using the parallel combination of both of the first mixer block 312 and the second mixer block 314, may be preferred for real-time applications, e.g. DPD actuators.

A reason for the effectiveness of the proposed mixer architecture employed by the first additional mixer block 402 is that it is a discrete ("digitized") representation of mixing effects at the output of the PA. Second and higher order harmonics and intermodulation distortion products (IMDs) associated with the modulated input signal may mix with the input signal. Depending on the frequency distribution, the resulting mixing products may land closely or on top of the main output signal and overlap with the main distortion of the PA (and which is described well by the GMP kernels). The mixer array provided by the first additional mixer block 402 helps to decouple such overlaps of different sources of in-band distortion. By virtue of the first additional mixer block 402, the complex and multi-layered process of secondary mixing in a PA is captured by a scalable array of offset-in-time digital mixers with memory, which are: (a) composed of linear functional elements (no nonlinear functions); and (b) straightforward to implement with tapped delay lines and FIR filters.

Figure 5:
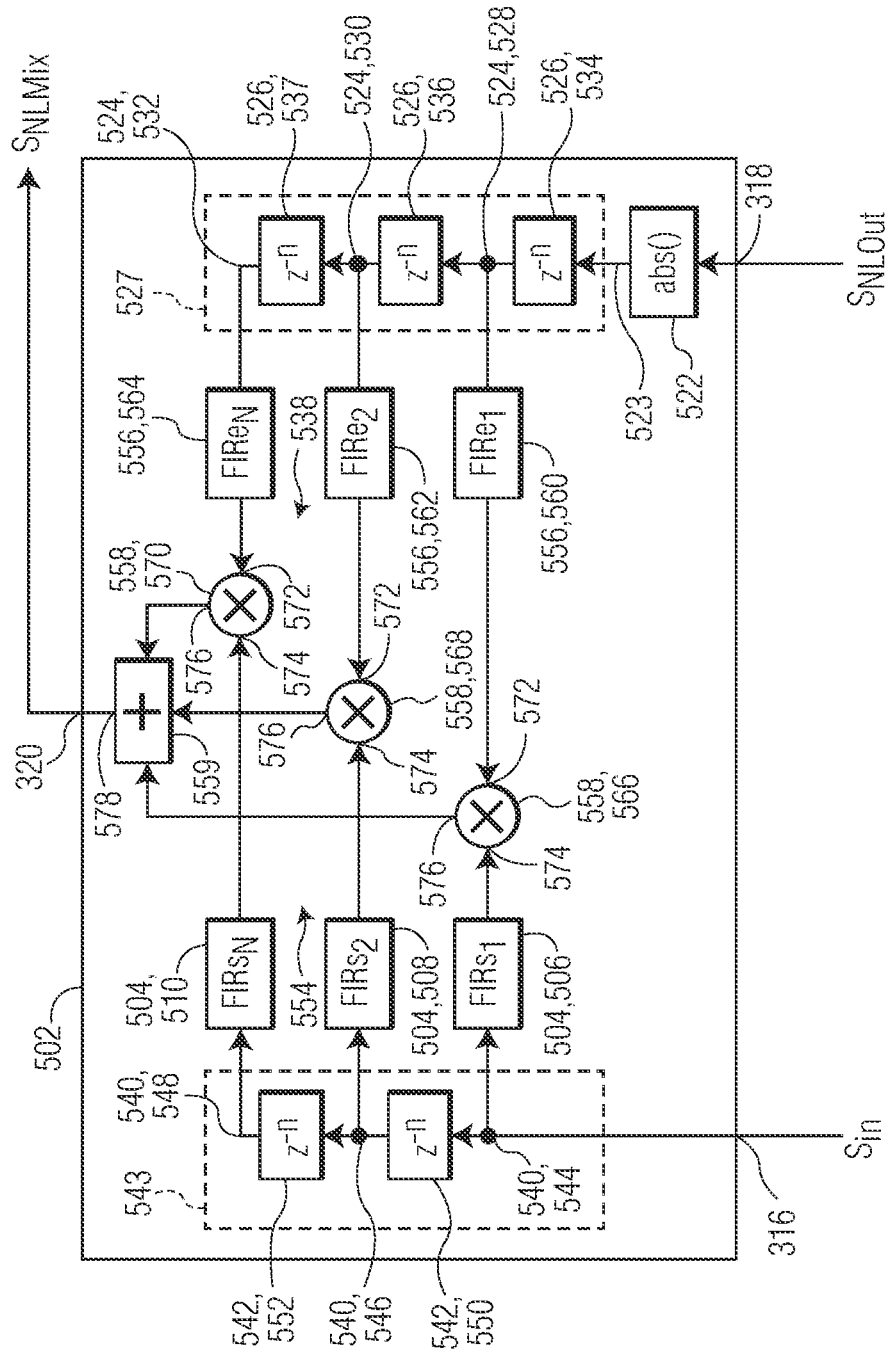

Notwithstanding the description of the first additional mixer block 402 provided in FIG. 4, the present disclosure is also intended to encompass other types of mixer blocks as well. For example, FIG. 5 provides a block diagram 500 to illustrate schematically a second additional mixer block 502, where the second additional mixer block again serves as a mixer array with memory replacing the high-order Volterra terms. The second additional mixer block 502 is similar to the first additional mixer block 402 in various respects. As with the first additional mixer block 402 (as well as the first mixer block 312 and the second mixer block 314), the second additional mixer block 502 includes a respective first input terminal 316 that may be coupled directly to the input port 302 so as to receive the baseband GMP model input signal ($S_{in}$), a respective second input terminal 318 that may be coupled directly to the intermediate node 308 so as to receive the intermediate signal output by the GMP model block 306, and a respective output terminal 320 that may be coupled directly to the summation block 310. As was the case with the first additional mixer block 402, when employing the second additional mixer block 502, a mixer-enhanced Volterra GMP model may be formed by the combination of that second additional mixer block along with each of the input port 302, output port 304, GMP model block 306, intermediate node 308, and summation block 310 of the primary model section 301 shown in FIG. 3. In such an embodiment, the output signal (or samples) $S_{out}$ that is output by the summation block 310 at the output port 304 is equal to (or based upon) the sum of each of (a) the intermediate signal generated by the GMP model block 306 at the intermediate node 308, which is the nonlinear GMP model output signal ($S_{NLOut}$), and (b) a second additional mixer block output signal ($S_{NLMix}$) provided at the respective output terminal 320 of the second additional mixer block 502.

Further, the second additional mixer block 502 is similar to the first additional mixer block 402 in terms of several of the inner blocks, nodes, and connections therewithin. Indeed, the second additional mixer block 502 includes an envelope input block 522 that is coupled to an envelope output node 523. The envelope output node 523 in turn is coupled to a series of further output nodes 524 and a series of first tapped delay lines 526 respectively coupling respective sequential pairs of the output nodes including the envelope output node 523 and the further output nodes 524, with the number of first tapped delay lines 526 being equal to the number of further output nodes 524.

In the present example, the series of further output nodes 524 includes first, second, and third further output nodes 528, 530, and 532, respectively, and the series of first tapped delay lines 526 includes first, second, and third ones 534, 536, and 537, respectively, each of which provides a delay of $Z^{-n}$. The first one 534 of the first tapped delay lines 526 links the envelope output node 523 with the first further output node 528, the second one 536 of the first tapped delay lines links the first further output node 528 with the second further output node 530, and the third one 537 of the first tapped delay lines links the second further output node 530 with the third further output node 532. As indicated by an ellipsis 538, any arbitrary number of the further output nodes 524 and any arbitrary number of the first tapped delay lines 526 (typically equal in number to the number of the further output nodes) may be present in other embodiments.

Additionally, the second additional mixer block 502 includes a series of additional nodes 540 and a series of second tapped delay lines 542. In the present example, the series of additional nodes 540 includes first, second, and third additional nodes 544, 546, and 548, respectively. Further, in the present example, the series of second tapped delay lines 542 includes first and second ones 550 and 552, respectively, each of which provides a delay of $Z^{-m}$. The first one 550 links the first additional node 544 with the second additional node 546 and the second one 552 links the second additional node 546 with the third additional node 548. However, as indicated by an ellipsis 554, any arbitrary number of the additional nodes 540 and any arbitrary number of the second tapped delay lines 542 (typically less than the number of output nodes by one) may be present in other embodiments.

Further, the second additional mixer block 502 includes a series of first mixing filters 556, a series of second mixing filters 504, a series of multiplication blocks 558, and a summation block 559. In the present example, the series of second mixing filters 504 includes first, second, and third mixing filters 506, 508, and 510, respectively, the series of first mixing filters 556 includes first, second, and third mixing filters 560, 562, and 564, respectively, and the series of multiplication blocks 558 includes first, second, and third multiplication blocks 566, 568 and 570, respectively. Additionally, in the present embodiment, each of the second mixing filters 504 is a finite impulse response filter (FIR), and the first, second, and third mixing filters 506, 508, and 510 may also respectively be referred to as $FIRs_1$, $FIRs_2$, and $FIRs_N$ (in this example, where N=3) blocks. Also, each of the first mixing filters 556 is a finite impulse response filter (FIR), and the first, second, and third mixing filters 560, 562, and 564 may also respectively be referred to as $FIRe_1$, $FIRe_2$, and $FIRe_N$ (in this example, where N=3) blocks. Notwithstanding the above discussion, again as represented by the ellipsis 538 and the ellipsis 554, in other embodiments any arbitrary number of the mixing filters may be present in the series of first mixing filters 556, any arbitrary number of the mixing filters may be present in the series of second mixing filters 504, and any arbitrary number of the multiplication blocks may be present in the series of multiplication blocks 558.

In the present embodiment, each of the multiplication blocks 558 includes a respective first input port 572, a respective second input port 574, and a respective output port 576. The respective first input ports 572 are respectively indirectly coupled to respective ones of the further output nodes 524 by way of respective ones of the first mixing filters 556, the respective second input ports 574 are respectively indirectly coupled to respective ones of the additional nodes 540 by way of respective ones of the second mixing filters 504, and each of the respective output ports 576 of each of the multiplication blocks 558 is coupled directly to the summation block 559. More particularly, in the present example embodiment, the respective first input ports 572 of the first, second, and third multiplication blocks 566, 568, and 570, respectively, are respectively indirectly coupled to the first, second, and third further output nodes 528, 530, and 532, respectively, by way of the first, second, and third filters 560, 562, and 564, respectively. Also, the respective second input ports 574 of the first, second, and third multiplication blocks 566, 568, and 570, respectively, are respectively indirectly coupled to the first, second, and third additional nodes 544, 546, and 548, respectively, by way of the first, second, and third mixing filters 506, 508, and 510, respectively.

Additionally, each of the respective multiplication blocks 558 operates to provide, at the respective output port 576 of the respective multiplication block, a respective intermediate signal that is the respective product of the respective signals received at the respective first input port 572 and respective second input port 574 of the respective multiplication block. Given that each of the respective output ports 576 of each of the multiplication blocks 558 is coupled to the summation block 559, the summation block receives each of the respective intermediate signals output by each of the respective multiplication blocks. The summation block 559 then additionally generates a summation output signal at an summation block output port 578 of the additional summation block. In the present embodiment, the summation block output port 578 is directly coupled to (and constitutes the same node as) the respective output terminal 320 of the second additional mixer block 502, and so the summation output signal at the summation block output port 578 is provided as the second additional mixer block output signal ($S_{NLMix}$) for receipt by the summation block 310 (e.g., which is shown in FIG. 3).

Although the second additional mixer block 502 is similar to the first additional mixer block 402 in several respects, the second additional mixer block also differs from the first additional mixer block. In particular, if the first additional mixer block 402 may be considered a "principal structure," in terms of serving as a primary functional block that operates as a mixer array, the second additional mixer block 502 may be considered an "alternate structure," in terms of serving as a primary functional block that operates as a mixer array. Indeed, the second additional mixer block 502 in several manners constitutes an inverted structure by comparison with the first additional mixer block 402.

More particularly it should be appreciated that, although the envelope input block 422 of the first additional mixer block 402 is coupled between the respective first input terminal 316 of the first additional mixer block and the envelope output node 423, in contrast the envelope input block 522 of the second additional mixer block 502 is coupled between the respective second input terminal 318 of the second additional mixer block and the envelope output node 523. Given this arrangement, the combination of the envelope output node 523, further output nodes 524, and series of first tapped delay lines 526 may be referred to as an output tapped delay line 527 (rather than input tapped delay line). Further, the first, second, and third mixing filters 560, 562, and 564 that provide signals to the respective first input ports 572 of the respective multiplication blocks 558 generate those signals based upon the nonlinear GMP model output signal received at the second input terminal 318 of the second additional mixer block 502 (rather than based upon the baseband GMP model input received at the respective first input terminal 316 of the second additional mixer block). In this embodiment, the first, second, and third mixing filters 560, 562, and 564 of the series of first mixing filters 556 may be referred to as Type 3 mixing filters.

Additionally, although it is the envelope input block 422 that is coupled to the respective first input terminal 316 of that first additional mixer block 402, in contrast in the embodiment of FIG. 5 it is the first additional node 544 of the series of additional nodes 540 that is directly coupled to (and constitutes the same electrical node as) the respective first input terminal 316 of the second additional mixer block 502. Given this arrangement, the combination of the series of additional nodes 540 (including the first, second, and third additional nodes 544, 546, and 548) and the series of second tapped delay lines 542 (including the first and second ones 550 and 552) may be referred to as an input tapped delay line 543 (rather than output tapped delay line). Further, the first, second, and third mixing filters 506, 508, and 510 that provide signals to the respective second input ports 574 of the respective multiplication blocks 558 generate those signals based upon the baseband GMP model input signal ($S_{in}$) received at the first input terminal 316 of the second additional mixer block 502 (rather than based upon the nonlinear GMP model output signal received at the respective second input terminal 318 of the second additional mixer block). In this embodiment, the first, second, and third mixing filters 506, 508, and 510 of the series of second mixing filters 504 may be referred to as Type 4 mixing filters.

In view of the above description, it will be appreciated that the second additional mixer block 502 of FIG. 5 effectively constitutes an inverted arrangement by comparison with the first additional mixer block 402 FIG. 4. In particular, the manner in which the envelope and signal mixing sources are coupled to the respective first and second input terminals 316 and 318 of the second additional mixer block 502 are effectively switched/reversed by comparison with the manner in which the envelope and signal mixing sources are coupled to the respective first and second input terminals 316 and 318 of the first additional mixer block 402. The corresponding filter arrays of the second additional mixer block (alternate structure) 502 are labeled as Type 3 and Type 4, in contrast to the Type 1 and Type 2 filter arrays of the first additional mixer block (principal structure) 402.

In addition to the above-described embodiments employing mixer blocks such as the first additional mixer block 402 of FIG. 4 or the second additional mixer block 502 of FIG. 5, the present disclosure is also intended to encompass additional embodiments in which DPD is achieved through the use of combinations of the first additional mixer block 402, the second additional mixer block 502, and/or one or more other mixer blocks. For example, for some PAs, a combination of both of the first additional mixer block 402 and the second additional mixer block 502—that is, both of the principal and alternate structures of the mixer arrays—is appropriate and may be particularly beneficial even though, for other PAs, only one of the first additional mixer block 402 or the second additional mixer block 502 (one of the principal structure or the alternate structure) may be sufficient. Further for example, the present disclosure also is intended to encompass embodiments in which modified version(s) of one or more of the first additional mixer block 402 and/or the second additional mixer block 502 are employed. It should be appreciated, for example, that the second mixer block 314 of FIG. 3 is a modified version of the first additional mixer block 402 of FIG. 4, from which the Type 1 mixing filters 404 are absent (such that the multiplication blocks are directly coupled to the additional nodes, and where L=N). Indeed, such an arrangement, in which the principal structure with Type 2 FIR filter array alone (Type 1 FIR filters are not included) may be particularly appropriate for various circumstances or applications. Alternatively, an arrangement having a Type 1 FIR filter array alone (Type 2 FIR filters not being included) may also be particularly appropriate for various circumstances or applications.

As discussed above in regard to FIGS. 3, 4, and 5, one or more embodiments of mixer blocks (or mixer arrays with memory) encompassed herein—for example, the first mixer block 312, second mixer block 314, first additional mixer block 402, and second additional mixer block 502—utilize one or more linear FIR filters. More particularly, as described above, each of the first mixer block 312 and the first additional mixer block 402 includes a respective series of Type 1 mixing filters, namely, the series of Type 1 mixing filters 356 and series of Type 1 mixing filter 404, respectively. Also, the second additional mixer block 502 includes the series of Type 4 mixing filters 504. Each of these Type 1 and Type 4 mixing filters is referred to as a "$FIR_{sx}$", where the subscript x is a variable that may take on any of a variety of values depending upon the number of mixing filters that are present in any given implementation, and where the subscript s signifies that the mixing filter is implemented as part of the overall mixer block in a manner such that the input signal provided to the filter is the baseband input signal $S_{in}$ or based upon (e.g., a time-delayed version of) the baseband input signal $S_{in}$. More generally, each of these mixing filters may be referred to herein as a FIRs[s] mixing filter insofar as the mixing filter operates based at least indirectly (or in a temporally-delayed manner) upon the baseband input signal $S_{in}$.

Additionally, each of the second mixer block 314 and the first additional mixer block 402 includes a respective series of Type 2 mixing filters, namely, the series of Type 2 mixing filters 256 and series of Type 2 mixing filter 456, respectively. Also, the second additional mixer block 502 includes the series of Type 3 mixing filters 556. Each of these Type 2 and Type 3 mixing filters is referred to as a "$FIR_{ey}$", where the subscript y is a variable that may take on any of a variety of values depending upon the number of mixing filters that are present in any given implementation, and where the subscript e signifies that the mixing filter is implemented as part of the overall mixer block in a manner such that the input signal provided to the filter is the envelope input signal abs(s) or based upon (e.g., a time-delayed version of) the envelope input signal abs(s). More generally, each of these mixing filters may be referred to herein as a FIRe[abs(s)] mixing filter insofar as the mixing filter operates based at least indirectly (or in a temporally-delayed manner) upon the envelope input signal abs(s).

Figure 6:
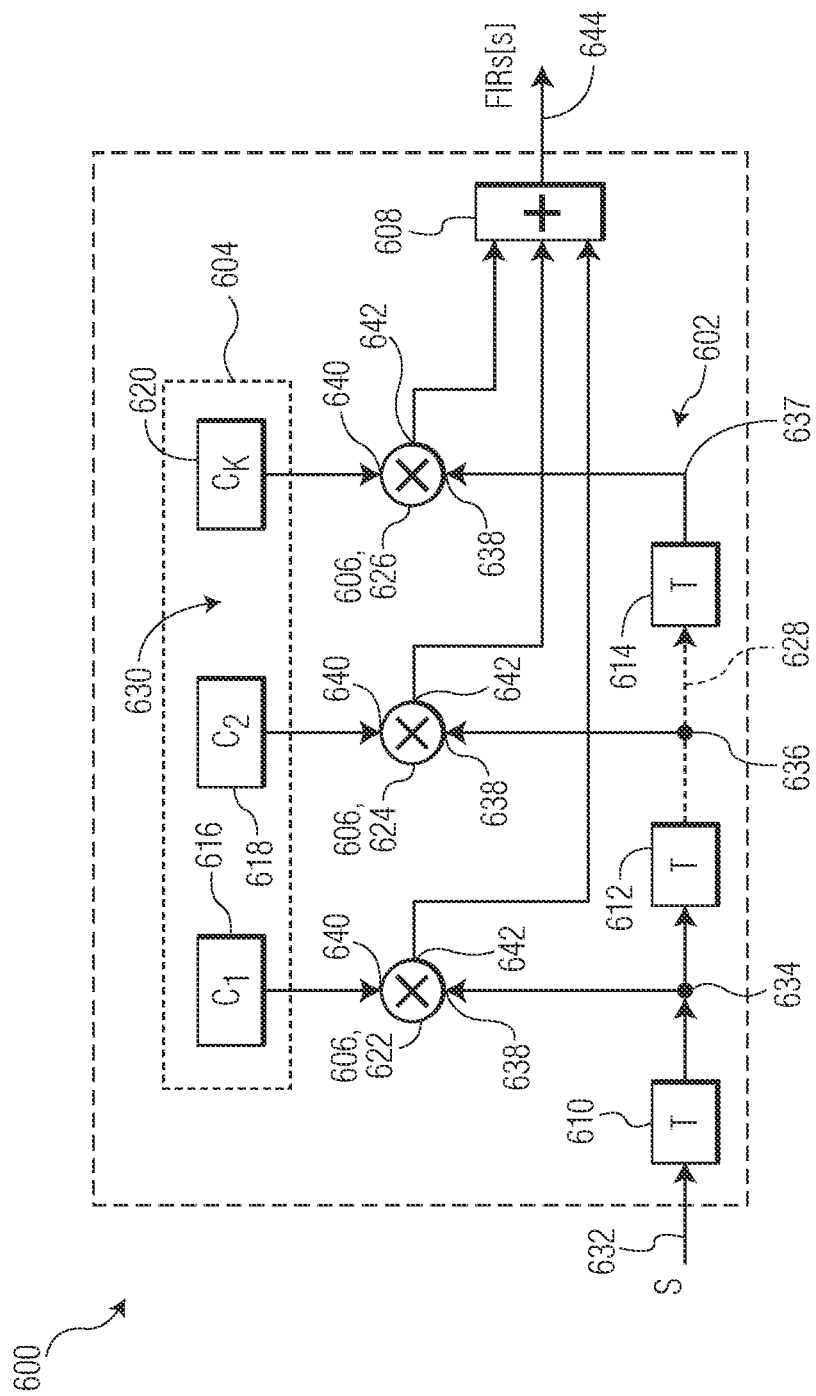
Figure 7:
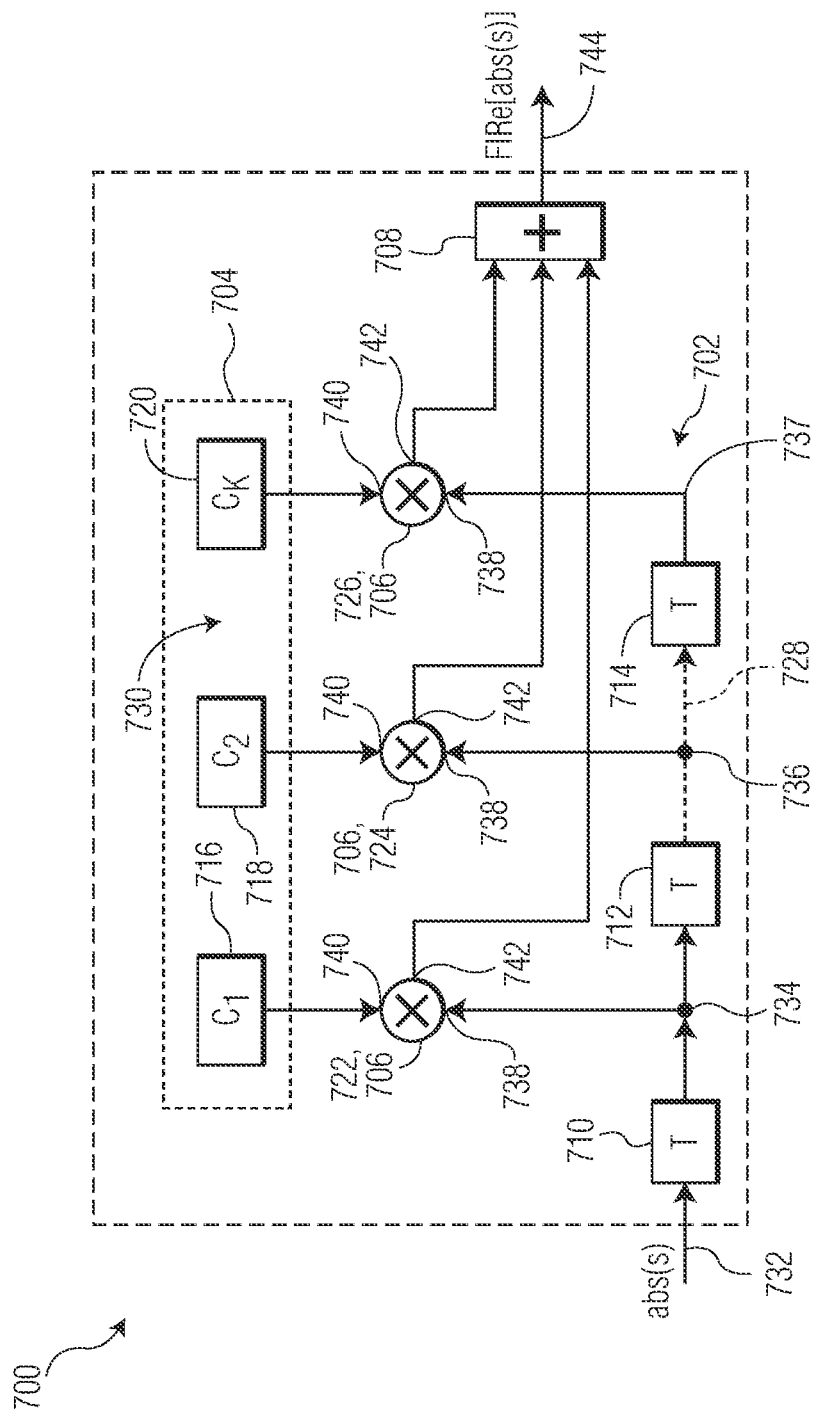

In at least some embodiments, each of the FIRs[s] mixing filters (e.g., the Type 1 and Type 4 mixing filters) takes a form as shown by a block diagram 600 in FIG. 6, and each of the FIRe[abs(s)] mixing filters (e.g., the Type 2 and Type 3 mixing filters) takes a form as shown by a block diagram 700 in FIG. 7. Thus, FIGS. 6 and 7 are provided to illustrate schematically two types of filters as may be implemented in regard to the embodiments of FIGS. 3, 4, and 5 (and other embodiments encompassed herein), one for the baseband signals as shown in FIG. 6, and another for the envelope signals as shown in FIG. 7.

More particularly as shown in FIG. 6, each of the FIRs[s] mixing filters includes a series of unit time delays 602, a plurality of complex-valued coefficient blocks 604 having respective coefficient values $C_1$ through $C_K$, a plurality of complex-complex multiplication blocks 606, and a summation block 608. In the present example, the series of unit time delays 602 includes first, second, and third unit time delays 610, 612, and 614, respectively, the plurality of complex-valued coefficient blocks 604 includes first, second, and third coefficient blocks 616, 618, and 620, respectively (with coefficient values $C_1$, $C_2$, and $C_K$, respectively), and the plurality of complex-complex multiplication blocks 606 includes first, second, and third multiplication blocks 622, 624, and 626, respectively. However, there may be any arbitrary number (and particularly more than three) of each of the unit time delays 602, complex-valued coefficient blocks 604, and complex-complex multiplication blocks 606 depending upon the embodiment, as indicated by a dashed line 628 linking the second unit time delay 612 with the third unit time delay 614, and as indicated by an ellipsis 630 positioned between the second coefficient block 618 and the third coefficient block 620.

The respective first, second, and third unit time delays 610, 612, and 614 are respectively coupled between an input terminal 632 and a first node 634, between the first node 634 and a second node 636, and between the second node and a third node 637, respectively. Each of the first, second, and third nodes 632, 634, and 636 may be considered a respective filter tap, and the unit delay between the filter taps may be T samples, where T>=1. Significantly, the first tap provided at the first node 634 uses a delayed input sample relative to the input terminal 632. Depending upon the embodiment, a filter of any type may have its own unique length and unit delay. As already noted above, any arbitrary number of the unit time delays 602, and any arbitrary number of the complex-valued coefficient blocks 604, may be present depending upon the embodiment, and the number of coefficients/taps is arbitrarily chosen as K, where K=3 in this example, for illustrative purposes.

The input terminal 632 is the input terminal for the overall FIRs[s] mixing filter represented by the block diagram 600, at which the baseband input signal $S_{in}$ (or simply s) is received. Additionally, each of the first, second, and third multiplication blocks 622, 624, and 626 has a respective first input port 638, a respective second input port 640, and a respective output port 642. The respective first input ports 638 of the first, second, and third multiplication blocks 622, 624, and 626 are respectively directly coupled to (and constitute the same respective node as) the first node 634, second node 636, and third node 637, respectively. The respective second input ports 640 of the first, second, and third multiplication blocks 622, 624, and 626 are respectively directly coupled to the respective first, second, and third coefficient blocks 616, 618, and 620, respectively, so as to receive respective signals corresponding to the respective coefficients associated with those respective coefficient blocks. Each of the first, second, and third multiplication blocks 622, 624, and 626 of the plurality of multiplication blocks 606 in the present embodiment is a complex-complex multiplication block insofar as all of the respective signals received at the respective second input ports 640 from the respective coefficient blocks 604 and received at the respective first input ports 638 from the first, second, and third nodes 634, 636, and 637 are complex signals.

Further, each of the respective output ports 642 of the first, second, and third multiplication blocks 622, 624, and 626 is coupled to the summation block 608, and is configured to output, at the respective output port 642 of the respective multiplication block, the respective product of the respective signals received at the respective first input port 638 and respective second input port 640 of the respective multiplication block. The summation block 608 in turn is configured to sum the respective signals provided from the first, second, and third multiplication blocks 622, 624, and 626 and to provide at an output terminal 644 thereof an output signal FIRs[s], which is a complex-valued output that is equal to (or based upon) that sum.

Additionally, as shown in FIG. 7, each of the FIRe[abs(s)] mixing filters includes a series of unit time delays 702, a plurality of complex-valued coefficient blocks 704 having respective coefficient values $C_1$ through $C_K$, a plurality of complex-real multiplication blocks 706, and a summation block 708. In the present example, the series of unit time delays 702 includes first, second, and third unit time delays 710, 712, and 714, respectively, the plurality of complex-valued coefficient blocks 704 includes first, second, and third coefficient blocks 716, 718, and 720, respectively (with coefficient values $C_1$, $C_2$, and $C_K$, respectively), and the plurality of complex-real multiplication blocks 706 includes first, second, and third multiplication blocks 722, 724, and 726, respectively. However, there may be any arbitrary number (and particularly more than three) of each of the unit time delays 702, complex-valued coefficient blocks 704, and complex-real multiplication blocks 706 depending upon the embodiment, as indicated by a dashed line 728 linking the second unit time delay 712 with the third unit time delay 714, and as indicated by an ellipsis 730 positioned between the second coefficient block 718 and the third coefficient block 720.

The respective first, second, and third unit time delays 710, 712, and 714 are respectively coupled between an input terminal 732 and a first node 734, between the first node 734 and a second node 736, and between the second node and a third node 737, respectively. Each of the first, second, and third nodes 732, 734, and 736 may be considered a respective filter tap, and the unit delay between the filter taps may be T samples, where T>=1. Significantly, the first tap provided at the first node 734 uses a delayed input sample relative to the input terminal 732. Depending upon the embodiment, a filter of any type may have its own unique length and unit delay. As already noted above, any arbitrary number of the unit time delays 702, and any arbitrary number of the complex-valued coefficient blocks 704, may be present depending upon the embodiment, and the number of coefficients/taps is arbitrarily chosen as K, where K=3 in this example, for illustrative purposes.

The input terminal 732 is the input terminal for the overall FIRe[abs(s)] mixing filter represented by the block diagram 700, at which the envelope input signal abs(s) is received. Additionally, each of the first, second, and third multiplication blocks 722, 724, and 726 has a respective first input port 738, a respective second input port 740, and a respective output port 742. The respective first input ports 738 of the first, second, and third multiplication blocks 722, 724, and 726 are respectively directly coupled to (and constitute the same respective node as) the first node 734, second node 736, and third node 737, respectively. The respective second input ports 740 of the first, second, and third multiplication blocks 722, 724, and 726 are respectively directly coupled to the respective first, second, and third coefficient blocks 716, 718, and 720, respectively, so as to receive respective signals corresponding to the respective coefficients associated with those respective coefficient blocks. Each of the first, second, and third multiplication blocks 722, 724, and 726 of the plurality of multiplication blocks 706 in the present embodiment is a complex-real multiplication block insofar as, although the respective signals received at the respective second input ports 740 from the respective coefficient blocks 704 respectively are complex signals, the respective signals received at the respective first input ports 738 from the first, second, and third nodes 734, 736, and 737, respectively, are time-delayed versions of the envelope input signal abs(s) and consequently are real signals.

Further, each of the respective output ports 742 of the first, second, and third multiplication blocks 722, 724, and 726 is coupled to the summation block 708, and is configured to output, at the respective output port 742 of the respective multiplication block, the respective product of the respective signals received at the respective first input port 738 and respective second input port 740 of the respective multiplication block. The summation block 708 in turn is configured to sum the respective signals provided from the first, second, and third multiplication blocks 722, 724, and 726 and to provide at an output terminal 744 thereof an output signal FIRe[abs(s)], which is a complex-valued output that is equal to (or based upon) that sum.

Each of the embodiments described in regard to FIGS. 3, 4, 5, 6, and 7 are implementations in which one or more mixer arrays such as any one or more of the first mixer block 312, second mixer block 314, first additional mixer block 402, and/or second additional mixer block 502 are implemented in relation to a primary model section such as the primary model section 301 employing a GMP model block such as the GMP model block 306. In each of these embodiments, first and second input ports of each of the respective mixer arrays are respectively coupled (directly or at least indirectly) to the input port and output port of the GMP model block. Nevertheless, the present disclosure also encompasses other embodiments in which one or more mixer arrays (with memory) are implemented/applied in relation to any PA model so as to account for secondary mixing effects. Indeed, any one or more of the mixer arrays described above in regard to FIGS. 3, 4, 5, 6, and 7 may be applied to any behavioral PA model (e.g., a nonlinear model, a model employing only GMP kernels, etc.), in order to improve its performance with extra terms as provided by the one or more mixer arrays.

Figure 2:
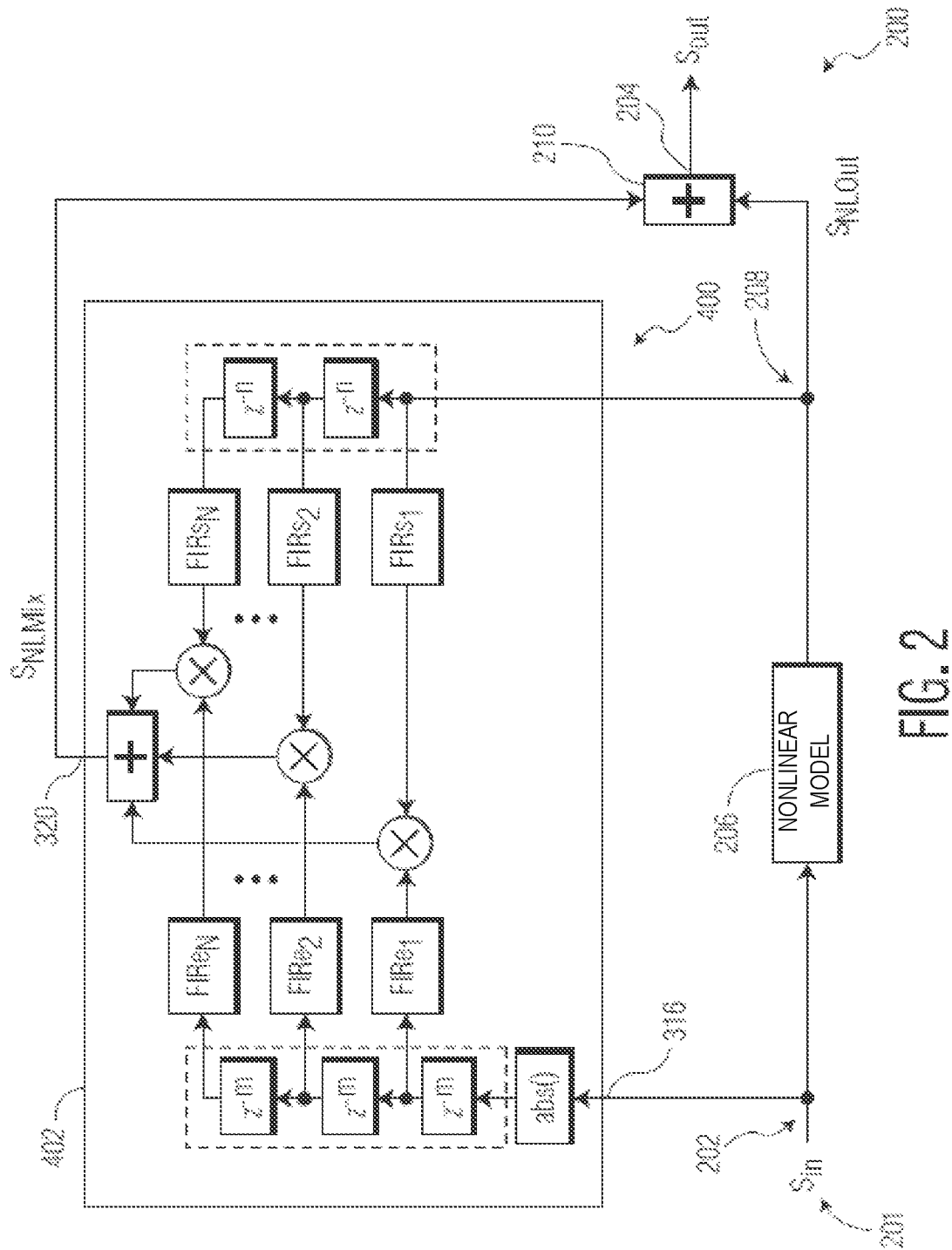
FIGS. 2-7 are block or schematic diagrams illustrating various manners of processing employed to perform DPD, which may be performed by a DPD module of the digital front-end of FIG. 1, in at least one or more embodiments encompassed herein.

For example, FIG. 2 provides a block diagram 200 to illustrate schematically one alternative embodiment of a mixer-enhanced nonlinear model, as may also be implemented to perform DPD processing in the DPD block 30 of the digital front-end 100 of FIG. 1. The mixer-enhanced nonlinear model of the block diagram 200 differs from the mixer-enhanced Volterra GMP model of the block diagram 300 of FIG. 3 in several respects. First, instead of employing the GMP model block 306, the mixer-enhanced nonlinear model shown in the block diagram 200 includes a nonlinear model block 206, which is intended to be representative of any behavioral PA model. For example, the nonlinear model block 206 may include a model employing only GMP kernels. Also for example, the nonlinear model block 206 may include one or more other non-GMP type DPD or PA models, such as models that are neural network-based, Volterra-based, piece-wise spline approximation-based, etc. (instead of, or in addition to, models that are GMP-based). Correspondingly, instead of employing the primary model section 301, the block diagram 200 includes a primary model section 201 in which the nonlinear model block 206 is coupled between an input port 202 at which the baseband input signal ($S_{in}$) is received (e.g., baseband GMP model input) and an intermediate node 208, along with a summation block 210 coupled to the intermediate node 208 and having an output port 204. Further, in the embodiment of FIG. 2, rather than employing either of the mixer blocks 312 or 314 of FIG. 3, it is the first additional mixer block 402 of FIG. 4 that is implemented, with the respective first input terminal 316 of that mixer block 402 being coupled directly to the input port 202 and the respective second input terminal 318 of that mixer block being coupled directly to the intermediate node 208. Also as shown, the respective output terminal 320 of the first additional mixer block 402 is coupled to the summation block 210, which is configured to generate, at the output port 204, an output signal that is an augmented model output signal ($S_{out}$), based upon the intermediate signal (or nonlinear GMP model output, $S_{NLOut}$) provided from the intermediate node 208 and a mixer block output signal (providing extra model terms produced by the mixer block or array 402, $S_{NLMix}$) that is output by the first additional mixer block 402 at the respective output terminal 320 thereof.

Further for example, each of the principle structure version of mixer array shown as the first additional mixer block 402 of FIG. 4 (having the Type 1 and Type 2 filters), or the alternate structure version of the mixer array shown as the second additional mixer block 502 of FIG. 5 (having the Type 3 and Type 4 filters), or other versions of mixer arrays having any of the four FIR filter types, may be implemented in regard to GMP model block 306 shown in FIG. 3 or in regard to other behavior PA models. The implementation of the primary nonlinear model (e.g., the GMP model block 306) is not of significance and only access to its input and output signals is needed. At the same time, it should also be noted that a typical constraint associated with implementing any of the one or more mixer arrays in regard to the primary model (e.g., the GMP model block 306 or other PA models/model blocks) is to avoid repeating, in the mixer array, terms or kernels that are already included in the primary model. Such conflicts may be avoided by selections in the delay line and the FIR filter tap configurations, in terms of appropriately offsetting or eliminating certain delay combinations of the mixing signals.

Thus, the present disclosure encompasses a variety of different systems, devices, and methods that employ any of a variety of mixer blocks or models for achieving DPD. Further for example in this regard, in at least some example embodiments encompassed herein, the present disclosure relates to a digital front-end circuit for use in performing radio frequency (RF) transmission. The digital front-end circuit includes a digital predistortion (DPD) block with a first input terminal and a first output terminal, a power amplifier (PA) having a second input terminal and a second output terminal, and a transmitter coupling the first output terminal of the DPD block at least indirectly with the second input terminal of the PA. The DPD block is configured to receive a first input signal and to provide a first output signal at the first output terminal, and the DPD block includes a nonlinear model that is configured to generate a nonlinear model output signal based upon the first input signal. Also, the DPD block additionally includes a first mixing module that is configured to receive the first input signal at a first input port and the nonlinear model output signal at a second input port, and to generate a first mixing module output signal based upon the first input signal and the nonlinear model output signal. Additionally, the DPD block further includes a first summation block that is configured to generate the first output signal at least in part as a first sum of the nonlinear model output signal and the first mixing module output signal. Further, the first mixing module includes a plurality of first finite impulse response (FIR) filters, a plurality of first multiplication blocks, and a second summation block, where the mixing module is configured to generate the first mixing module output signal as a second sum of a plurality of intermediate output signals, where the respective intermediate output signals are generated by the respective first multiplication blocks as respective products of respective first additional input signals based at least indirectly upon the first input signal and respective second additional input signals based at least indirectly upon the nonlinear model output signal. Additionally, either the respective first additional input signals are respectively provided by the respective first FIR filters based at least indirectly upon the first input signal, or the respective second additional input signals are respectively provided by the respective first FIR filters based at least indirectly upon the nonlinear model output signal.

Further, in at least some example embodiments encompassed herein, the present disclosure relates to a system for digital predistortion (DPD). The system includes a DPD block with a first input terminal and a first output terminal, a power amplifier (PA) having a second input terminal and a second output terminal, and a transmitter coupling the first output terminal of the DPD block at least indirectly with the second input terminal of the PA. The DPD block is configured to receive a first input signal and to provide a first output signal at the first output terminal, and the DPD block includes a Generalized Memory Polynomials (GMP) model that is configured to generate a GMP model output signal based upon the first input signal. Also, the DPD block additionally includes a first mixing module that is configured to receive the first input signal at a first input port and the GMP model output signal at a second input port, and to generate a first mixing module output signal based upon the first input signal and the GMP model output signal. Additionally, the DPD block further includes a first summation block that is configured to generate the first output signal at least in part as a first sum of the GMP model output signal and the first mixing module output signal. Further, the first mixing module includes a plurality of first finite impulse response (FIR) filters, a plurality of first multiplication blocks, and a second summation block, where the mixing module is configured to generate the first mixing module output signal as a second sum of a plurality of intermediate output signals, and where the respective intermediate output signals are generated by the respective first multiplication blocks as respective products of respective first additional input signals based at least indirectly upon the first input signal and respective second additional input signals based at least indirectly upon the GMP model output signal. Also, at least some of the first and second additional input signals are respectively provided by the respective first FIR filters based at least indirectly upon either the first input signal or the GMP model output signal. Further, each of the first FIR filters includes a respective filter input port, a respective filter output port, a respective plurality of complex-valued coefficients, a plurality of additional multiplication blocks, and a third summation block.

Additionally, in at least some example embodiments encompassed herein, the present disclosure relates to a method of digital predistortion (DPD) for a power amplifier (PA). The method includes receiving a first input signal at a first input terminal of a digital predistortion (DPD) block that additionally includes a first output terminal. Also, the method includes performing first processing, at a nonlinear model of the DPD block, so as to generate a nonlinear model output signal based at least indirectly upon the first input signal. Further, the method includes performing second processing at a first mixing module having a plurality of first finite impulse response (FIR) filters, a plurality of first multiplication blocks, and a first summation block, so as to generate a first mixing module output signal based upon the first input signal and the nonlinear model output signal. Additionally, the second processing includes summing at the first summation block a plurality of intermediate output signals that are respectively generated by the respective first multiplication blocks as respective products of respective first additional input signals based at least indirectly upon the first input signal and respective second additional input signals based at least indirectly upon the nonlinear model output signal. Also, either the respective first additional input signals are respectively provided by the respective first FIR filters based at least indirectly upon the first input signal, or the respective second additional input signals are respectively provided by the respective first FIR filters based at least indirectly upon the nonlinear model output signal. Further, the method includes generating a first output signal at a second summation block at least in part by summing the nonlinear model output signal and the first mixing module output signal. Additionally, the method includes providing the first output signal from the first output terminal of the DPD block for receipt by a transmitter coupling the first output terminal of the DPD block at least indirectly with a second input terminal of a power amplifier (PA) having a second output terminal.

It should be appreciated that embodiments encompassed herein may be applied as a real-time actuator of a DPD system in a VLSI such as application specific integrated circuit/field programmable gate array (ASIC/FPGA) HW as HDL code, or in a vector processor (or a VLSI employing vector processing) as embedded SW (or embedded code). In at least some embodiments, any one or more, or all, of the blocks shown in the block diagrams of FIGS. 3, 4, 5, 6, and 7 are physical units in a digital very large scale integration (VLSI) integrated circuit or device such as an ASIC or FPGA, e.g., are provided by dedicated areas in silicon. In addition, or alternatively, any one or more, or all, of the blocks shown in the block diagrams of FIGS. 3, 4, 5, 6, and 7 may be functionally provided in a vector processor (e.g., as a second or alternative option).

At least some of the proposed architectures described herein are directly and universally applicable to all PAs, and may work seamlessly with single and multiband signals. Also, at least some of the mixer-enhanced models described herein are capable of modeling complex nonlinear processes involving secondary mixing of input signals with second harmonics and IMD products as well as higher order distortion. Further, use of least some of the mixer-enhanced models described herein offer an efficient alternative to complex high-order Volterra kernels and fill the performance gap for use-cases that may not be well approximated by standard behavioral models working on primary mixing and nonlinear memory (e.g. GMP).

The present disclosure additionally encompasses numerous systems that employ embodiments of the mixer-enhanced models/architectures described herein. Systems that employ embodiments of the mixer-enhanced models/architectures described herein, such as the digital front-end 100 for a transmitter incorporating DPD, may be implemented in relation to high-power PAs, massive multiple-input, multiple-output (MMIMO) power amplifier modules (PAMs) (such as MMIMO 5G PAMs), mmWave antenna array beamformer integrated circuits (ICs), wireless local area network (WLAN) WiFi PAs, and future PAs for band X of 6G 3GPP applications. Such systems may include base stations and/or any of a variety of types of transmitters, receivers, transceivers, and other devices.

One or more advantages may arise from applying mixer arrays (e.g., any of the first mixer block 312, second mixer block 314, first additional mixer block 402, and/or second additional mixer block 502) to improve standard behavioral PA models (such as the GMP model block 306) as described herein. In particular, such applications of mixer arrays as described herein may allow for excellent approximations of complex memory dynamics, which are ignored by conventional models that target primary mixing and nonlinear memory. Indeed, at least some such applications as encompassed herein (a) may achieve direct approximation of physical behavior using digital mixers instead of the heuristic High-order Volterra kernels, (b) may provide a potential for 10 dB smaller residual error in PA modeling for characterization purposes, and/or (c) may provide a potential for 6 dB better DPD performance especially with poorly terminated devices. Additionally, such applications of mixer arrays as described herein may be advantageous in that the effects of such a mixer array are directly related to secondary mixing at the PA output, particularly in terms of (a) implementing digital baseband mixing to behaviorally model the envelope distortion at the PA output from secondary mixing, and/or (b) the inputs to the mixers being the baseband equivalents of the RF signals at the PA output contributing to secondary mixing.

Further, such applications of mixer arrays as described herein may also be advantageous in terms of allowing for lower complexity of computation and pruning versus the High-order Volterra terms, particularly insofar as the mixer arrays (a) are composed of arrays of delay lines and FIR filters, (b) enable easy scalability by adding more filter taps until a performance target is achieved, and/or (c) require two or three chained complex-valued multiplications regardless of the targeted memory depth or model order. Additionally, such applications of mixer arrays as described herein may also be advantageous in terms of their potential for serving as/providing new PA characterization tools, especially insofar as the model terms may be visualized in frequency domain, and/or in that the mixer arrays enable design iterations of HW to be compared with improved accuracy. Further, such applications of mixer arrays as described herein may be universally applicable to existing DPD actuators, and may be wrapped around existing solutions as an add on when performance enhancement is needed. The implementation of such mixer arrays (e.g., so as to adapt conventional models) is compatible with training of GMP actuators. Additionally, such applications of mixer arrays as described herein may be universally applicable to any modulation standards and signal configurations (including single and multiband).

Also, at least some embodiments encompassed herein are advantageous in that the embodiments employ mixer architectures that do not utilize explicitly defined kernels to improve the GMP model structure. Such an embodiment may be more computationally efficient that some conventional arrangements insofar as the embodiment reuses the output signal of the primary or base model (e.g. GMP without enhancements) and is configured to target directly the secondary mixing effects in the PA. Further, at least some embodiments encompassed herein are advantageous in that the output samples of the primary or base model (not limited to GMP) are passed through mixer(s) with linear memory, with the other input(s) of the mixer(s) being sourced by the input signal to the model. Also, the introduction of linear FIR filters (rather than nonlinear functions such as polynomials) to implement the mixer memory is valuable with respect to wide BW applications. The number of mixer branches and their memory depth are easily scalable to accommodate different types of PAs including, for example, class AB or Doherty PAs. The model performance is verified in wide BW PAs for cellular application from sub 6 GHz to mmWave.

Further, at least some embodiments encompassed herein are advantageous in that those embodiments are configured so that, to model secondary mixing in those embodiments, a functional approach is adopted instead of the explicit use of Volterra kernels. If the main source of distortion at the PA output is already approximated well by an efficient nonlinear model (e.g. GMP), then feeding this output along with the input signal to an array of delayed multipliers is a functionally accurate baseband approximation of the complex processes taking place in the devices at RF frequency. These linear multiplication operations may be significantly simpler than directly synthesized high-order IMD products especially after being organized in an array of mixers made of linear FIR filters.

While the principles of the invention have been described above in connection with specific apparatus, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A digital front-end circuit for use in performing radio frequency (RF) transmission, the digital front-end circuit comprising:
   a digital predistortion (DPD) block with a first input terminal and a first output terminal;
   a power amplifier (PA) having a second input terminal and a second output terminal; and
   a transmitter coupling the first output terminal of the DPD block at least indirectly with the second input terminal of the PA,
   wherein the DPD block is configured to receive a first input signal and to provide a first output signal at the first output terminal, and wherein the DPD block includes a nonlinear model that is configured to generate a nonlinear model output signal based upon the first input signal, wherein the DPD block additionally includes a first mixing module that is configured to receive the first input signal at a first input port and the nonlinear model output signal at a second input port, and to generate a first mixing module output signal based upon the first input signal and the nonlinear model output signal, wherein the DPD block further includes a first summation block that is configured to generate the first output signal at least in part as a first sum of the nonlinear model output signal and the first mixing module output signal, wherein the first mixing module includes a plurality of first finite impulse response (FIR) filters, a plurality of first multiplication blocks, and a second summation block, wherein the mixing module is configured to generate the first mixing module output signal as a second sum of a plurality of intermediate output signals, wherein the respective intermediate output signals are generated by the respective first multiplication blocks as respective products of respective first additional input signals based at least indirectly upon the first input signal and respective second additional input signals based at least indirectly upon the nonlinear model output signal, and wherein either the respective first additional input signals are respectively provided by the respective first FIR filters based at least indirectly upon the first input signal, or the respective second additional input signals are respectively provided by the respective first FIR filters based at least indirectly upon the nonlinear model output signal.

2. The digital front-end circuit of claim 1, wherein the respective second additional input signals are respectively provided by the respective first FIR filters based at least indirectly upon the nonlinear model output signal.

3. The digital front-end circuit of claim 1, wherein each of the first multiplication blocks includes a respective first multiplication block input port at which the respective multiplication block receives the respective first additional input signal, and a respective second multiplication block input port at which the respective multiplication block receives the respective second additional input signal, wherein the first mixing module includes an envelope input block coupled between the first input port and a first output node, and a first delay line coupled between the first output node and a second output node, wherein the respective first multiplication block input ports of first and second ones of the first multiplication blocks are coupled to the first output node and the second output node, respectively, so as to receive first and second ones of the first additional input signals, wherein the first mixing module additionally includes a second delay line coupled between the second input port and a third output node, and wherein a first one of the first FIR filters is coupled between the second input port and the respective second multiplication block input port of the first one of the first multiplication blocks, and a second one of the first FIR filters is coupled between the third node and the respective second multiplication block input port of the second one of the first multiplication blocks.

4. The digital front-end circuit of claim 3, wherein the DPD block additionally includes a second mixing module that is configured to receive the first input signal at a third input port and the nonlinear model output signal at a fourth input port, and to generate a second mixing module output signal based upon the first input signal and the nonlinear model output signal, wherein the first summation block is configured to generate the first output signal additionally based upon the second mixing module output signal.

5. The digital front-end circuit of claim 4, wherein the second mixing module includes a plurality of second FIR filters, a plurality of second multiplication blocks, and a third summation block, wherein the second mixing module is configured to generate the second mixing module output signal as a third sum of a plurality of additional intermediate output signals, wherein the respective additional intermediate output signals are generated by the respective second multiplication blocks as respective products of respective third additional input signals based at least indirectly upon the first input signal and respective fourth additional input signals based at least indirectly upon the nonlinear model output signal, and wherein the respective third additional input signals are respectively provided by the respective second FIR filters based at least indirectly upon the first input signal.

6. The digital front-end circuit of claim 5, wherein each of the second multiplication blocks includes a respective third multiplication block input port at which the respective multiplication block receives the respective third additional input signal, and a respective fourth multiplication block input port at which the respective multiplication block receives the respective fourth additional input signal, wherein the second mixing module includes an additional envelope input block and a third delay line coupled in series between the third input port and a fourth output node, and a fourth delay line coupled between the fourth output node and a fifth output node, wherein the second mixing module additionally includes a fourth delay line coupled between the fourth input port and a sixth output node, wherein the respective third multiplication block input ports of first and second ones of the second multiplication blocks are coupled to the fourth output node and the fifth output node, respectively, so as to receive first and second ones of the third additional input signals, and wherein a first one of the second FIR filters is coupled between the fourth input port and the respective fourth multiplication block input port of the first one of the second multiplication blocks, and a second one of the second FIR filters is coupled between the sixth node and the respective second multiplication block input port of the second one of the second multiplication blocks.

7. The digital front-end circuit of claim 1, wherein the first mixing module includes a plurality of second FIR filters, wherein the respective first additional input signals are respectively provided by the respective first FIR filters based at least indirectly upon the first input signal, wherein the respective second additional input signals are respectively provided by the respective second FIR filters based at least indirectly upon the nonlinear model output signal, and wherein each of the first multiplication blocks includes a respective first multiplication block input port at which the respective multiplication block receives the respective first additional input signal, and a respective second multiplication block input port at which the respective multiplication block receives the respective second additional input signal.

8. The digital front-end circuit of claim 7, wherein the first mixing module includes an envelope input block a first delay line coupled in series between the first input port and a first output node, and a second delay line coupled between the first output node and a second output node, wherein the first mixing module additionally includes a third delay line coupled between the second input port and a third output node, wherein the respective first multiplication block input ports of first and second ones of the first multiplication blocks are coupled to the first output node and the second output node, respectively, by first and second ones of the first FIR filters, respectively, so as to receive first and second ones of the first additional input signals, respectively, and wherein the respective second multiplication block input ports of the first and second ones of the first multiplication blocks are coupled to the second input port and the third output node, respectively, by first and second ones of the second FIR filters, respectively, so as to receive first and second ones of the second additional input signals, respectively.

9. The digital front-end circuit of claim 7, wherein the first mixing module includes an envelope input block a first delay line coupled in series between the second input port and a first output node, and a second delay line coupled between the first output node and a second output node, wherein the first mixing module additionally includes a third delay line coupled between the first input port and a third output node, wherein the respective first multiplication block input ports of first and second ones of the first multiplication blocks are coupled to the first input port and the third output node, respectively, by first and second ones of the first FIR filters, respectively, so as to receive first and second ones of the first additional input signals, respectively, and wherein the respective second multiplication block input ports of the first and second ones of the first multiplication blocks are coupled to the first output node and the second output node, respectively, by first and second ones of the second FIR filters, respectively, so as to receive first and second ones of the second additional input signals, respectively.

10. The digital front-end circuit of claim 1, wherein each of the first FIR filters includes a respective filter input port, a respective filter output port, a respective plurality of complex-valued coefficients, a plurality of additional multiplication blocks, and a third summation block.

11. The digital front-end circuit of claim 10, wherein each of the first FIR filters is configured to receive, at the respective filter input port, the first input signal, which is a complex-valued input signal, and wherein each of the additional multiplication blocks is a complex-complex multiplication block.

12. The digital front-end circuit of claim 11, wherein the first mixing module is configured so that:

each of the additional multiplication blocks of a first one of the first FIR filters includes a respective first multiplication block input port and a respective second multiplication block input port, the respective first multiplication block input ports of the first one of the first FIR filters are respectively provided with respective ones of the complex-valued coefficients, and the respective second multiplication block input ports of the first one of the first FIR filters are respectively provided with respective time-delayed versions of the first input signal.

13. The digital front-end circuit of claim 10, wherein each of the first FIR filters is configured to receive, at the respective filter input port, an envelope input signal based upon the first input signal, wherein the envelope input signal is a real-valued input signal, and wherein each of the additional multiplication blocks is a complex-real multiplication block.

14. The digital front-end circuit of claim 13, wherein the first mixing module is configured so that:

each of the additional multiplication blocks of a first one of the first FIR filters includes a respective first multiplication block input port and a respective second multiplication block input port, the respective first multiplication block input ports of the first one of the first FIR filters are respectively provided with respective ones of the complex-valued coefficients, and the respective second multiplication block input ports of the first one of the first FIR filters are respectively provided with respective time-delayed versions of the envelope input signal.

15. The digital front-end circuit of claim 1, wherein either:

(a) the nonlinear model is a Generalized Memory Polynomials (GMP) model, and the nonlinear model output signal is a GMP model output signal; or (b) the nonlinear model includes at least one non-GMP type DPD or PA model selected from the group consisting of a neural network-based model, a Volterra-based model, a piece-wise spline approximation-based model, or another non-GMP type DPD or PA model.

16. The digital front-end circuit of claim 1, wherein the digital front-end circuit is implemented on a single integrated circuit.

17. The digital front-end circuit of claim 1, wherein the DPD block is implemented using a vector processor.

18. A system for digital predistortion (DPD), the system comprising:

a DPD block with a first input terminal and a first output terminal;

a power amplifier (PA) having a second input terminal and a second output terminal; and a transmitter coupling the first output terminal of the DPD block at least indirectly with the second input terminal of the PA, wherein the DPD block is configured to receive a first input signal and to provide a first output signal at the first output terminal, and wherein the DPD block includes a Generalized Memory Polynomials (GMP) model that is configured to generate a GMP model output signal based upon the first input signal, wherein the DPD block additionally includes a first mixing module that is configured to receive the first input signal at a first input port and the GMP model output signal at a second input port, and to generate a first mixing module output signal based upon the first input signal and the GMP model output signal, wherein the DPD block further includes a first summation block that is configured to generate the first output signal at least in part as a first sum of the GMP model output signal and the first mixing module output signal, wherein the first mixing module includes a plurality of first finite impulse response (FIR) filters, a plurality of first multiplication blocks, and a second summation block, wherein the mixing module is configured to generate the first mixing module output signal as a second sum of a plurality of intermediate output signals, wherein the respective intermediate output signals are generated by the respective first multiplication blocks as respective products of respective first additional input signals based at least indirectly upon the first input signal and respective second additional input signals based at least indirectly upon the GMP model output signal, and wherein at least some of the first and second additional input signals are respectively provided by the respective first FIR filters based at least indirectly upon either the first input signal or the GMP model output signal, and wherein each of the first FIR filters includes a respective filter input port, a respective filter output port, a respective plurality of complex-valued coefficients, a plurality of additional multiplication blocks, and a third summation block.

19. A wireless transmission device including the system of claim 18, wherein the DPD block, PA, and transmitter are implemented on a single integrated circuit, and wherein at least a first one of the first and second additional input signals is provided by a first one of the first FIR filters that operates in response to receiving the first input signal and at least a second one of the first and second additional input signals is provided by a second one of the first FIR filters that operates in response to receiving an envelope input signal.

20. A method of digital predistortion (DPD) for a power amplifier (PA), the method comprising:

receiving a first input signal at a first input terminal of a digital predistortion (DPD) block that additionally includes a first output terminal;

performing first processing, at a nonlinear model of the DPD block, so as to generate a nonlinear model output signal based at least indirectly upon the first input signal;

performing second processing at a first mixing module having a plurality of first finite impulse response (FIR) filters, a plurality of first multiplication blocks, and a first summation block, so as to generate a first mixing module output signal based upon the first input signal and the nonlinear model output signal, wherein the second processing includes summing at the first summation block a plurality of intermediate output signals that are respectively generated by the respective first multiplication blocks as respective products of respective first additional input signals based at least indirectly upon the first input signal and respective second additional input signals based at least indirectly upon the nonlinear model output signal, wherein either the respective first additional input signals are respectively provided by the respective first FIR filters based at least indirectly upon the first input signal, or the respective second additional input signals are respectively provided by the respective first FIR filters based at least indirectly upon the nonlinear model output signal;

generating a first output signal at a second summation block at least in part by summing the nonlinear model output signal and the first mixing module output signal; and providing the first output signal from the first output terminal of the DPD block for receipt by a transmitter coupling the first output terminal of the DPD block at least indirectly with a second input terminal of a power amplifier (PA) having a second output terminal.

* * * * *